US011031994B2

(12) United States Patent
Ashworth et al.

(10) Patent No.: US 11,031,994 B2
(45) Date of Patent: Jun. 8, 2021

(54) SIGNAL BOOSTER FOR BOOSTING SIGNALS IN CONTIGUOUS BANDS

(71) Applicant: WILSON ELECTRONICS, LLC, St. George, UT (US)

(72) Inventors: Christopher Ken Ashworth, Toquerville, UT (US); Patrick Lee Cook, Cedar City, UT (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 16/696,853

(22) Filed: Nov. 26, 2019

(65) Prior Publication Data

US 2020/0169316 A1    May 28, 2020

Related U.S. Application Data

(63) Continuation-in-part of application No. 15/814,183, filed on Nov. 15, 2017, now abandoned.

(60) Provisional application No. 62/422,512, filed on Nov. 15, 2016.

(51) Int. Cl.
  *H04B 7/15* (2006.01)
  *H04B 7/155* (2006.01)
  *H04B 17/318* (2015.01)

(52) U.S. Cl.
  CPC ..... *H04B 7/15535* (2013.01); *H04B 7/15542* (2013.01); *H04B 7/15578* (2013.01); *H04B 17/318* (2015.01)

(58) Field of Classification Search
  CPC .. H04W 16/26; H04W 88/08; H04B 7/15542; H04B 7/14; H04B 1/0057; H04B 17/318; H04B 7/15535; H04B 7/15578; H04B 7/18536
  See application file for complete search history.

(56) References Cited

U.S. PATENT DOCUMENTS

| 4,776,032 A | 10/1988 | Odate et al. |
| 5,303,395 A | 4/1994 | Dayani |
| 5,737,687 A | 4/1998 | Martin et al. |
| 5,745,479 A | 4/1998 | Burns et al. |
| 5,777,530 A | 7/1998 | Nakatuka |

(Continued)

FOREIGN PATENT DOCUMENTS

| EP | 0406905 A2 * | 1/1991 | .......... H04B 7/2606 |
| EP | 0406905 A2 | 1/1991 | |

(Continued)

OTHER PUBLICATIONS

PCT Application No. PCT/US2017/061842 Filing date Nov. 15, 2017, Christopher Ken Ashworth International Search Report dated Mar. 5, 2018, 20 Pages.

(Continued)

*Primary Examiner* — Dong-Chang Shiue
(74) *Attorney, Agent, or Firm* — Thorpe North & Western

(57) ABSTRACT

Technology for a signal booster is disclosed. The signal booster can include a first signal booster, and a second signal booster communicatively coupled to the first signal booster. The first signal booster can be configured to amplify signals in a first band. The second signal booster can be configured to amplify signals in a second band, and a frequency range of the second band is contiguous with a frequency range of the first band.

27 Claims, 11 Drawing Sheets

(56) References Cited

U.S. PATENT DOCUMENTS

| | | |
|---|---|---|
| 5,835,848 A | 11/1998 | Bi et al. |
| 6,005,884 A | 12/1999 | Cook et al. |
| 6,363,262 B1 | 3/2002 | McNicol |
| 6,711,388 B1 | 3/2004 | Neitiniemi |
| 6,889,033 B2 | 5/2005 | Bongfeldt |
| 6,990,313 B1 | 1/2006 | Yarkosky |
| 7,035,587 B1 | 4/2006 | Yarkosky |
| 7,149,488 B2 | 12/2006 | Khorram |
| 7,221,967 B2 | 5/2007 | Van Buren et al. |
| 7,610,029 B2 | 10/2009 | Li |
| 7,974,573 B2 | 7/2011 | Dean |
| 8,068,783 B2 | 11/2011 | Braithwaite et al. |
| 8,150,309 B2 | 4/2012 | Braithwaite |
| 9,054,664 B1* | 6/2015 | Ashworth ............ H03G 3/3042 |
| 9,054,777 B2 | 6/2015 | Wood et al. |
| 9,065,415 B1 | 6/2015 | Van Buren et al. |
| 2002/0044594 A1 | 4/2002 | Bongfeldt |
| 2003/0016761 A1 | 1/2003 | Min |
| 2003/0123401 A1 | 7/2003 | Dean |
| 2004/0110469 A1* | 6/2004 | Judd ..................... G01S 19/25 455/15 |
| 2004/0137854 A1 | 7/2004 | Ge |
| 2004/0146013 A1 | 7/2004 | Song et al. |
| 2004/0166802 A1 | 8/2004 | McKay, Sr. et al. |
| 2004/0219876 A1 | 11/2004 | Baker et al. |
| 2004/0235417 A1 | 11/2004 | Dean |
| 2005/0118949 A1 | 6/2005 | Allen et al. |
| 2006/0084379 A1 | 4/2006 | O'Neill |
| 2007/0071128 A1 | 3/2007 | Meir et al. |
| 2007/0188235 A1 | 8/2007 | Dean |
| 2008/0081555 A1 | 4/2008 | Kong et al. |
| 2008/0096483 A1 | 4/2008 | Van Buren et al. |
| 2008/0113617 A1 | 5/2008 | Braithwaite |
| 2008/0278237 A1 | 11/2008 | Blin |
| 2009/0011736 A1* | 1/2009 | Malasani ................. H04B 1/18 455/307 |
| 2009/0325481 A1* | 12/2009 | Mohebbi .............. H04B 7/2606 455/15 |
| 2010/0311480 A1* | 12/2010 | Raines ............... H04B 7/15535 455/575.7 |
| 2011/0151771 A1 | 6/2011 | Son |
| 2011/0151775 A1 | 6/2011 | Kang et al. |
| 2011/0201269 A1 | 8/2011 | Hobbs et al. |
| 2013/0077502 A1* | 3/2013 | Gainey ............. H04B 7/15578 370/252 |
| 2013/0177047 A1 | 7/2013 | Kwak et al. |
| 2014/0169501 A1* | 6/2014 | Nazarathy .............. H03H 11/52 375/316 |
| 2015/0009889 A1* | 1/2015 | Zhan ................. H04B 7/15542 370/315 |
| 2015/0029909 A1 | 1/2015 | Ashworth et al. |
| 2016/0036403 A1 | 2/2016 | Ashworth et al. |
| 2016/0211928 A1 | 7/2016 | Brewer et al. |
| 2017/0346548 A1* | 11/2017 | Chang ................ H04B 7/15528 |
| 2018/0048293 A1 | 2/2018 | Gathman et al. |
| 2018/0070323 A1* | 3/2018 | Zhan ..................... H04W 52/46 |

FOREIGN PATENT DOCUMENTS

| | | |
|---|---|---|
| EP | 1324514 A2 | 7/2003 |
| EP | 1525678 B1 | 7/2008 |

OTHER PUBLICATIONS

European Search Report, Application No. 19199952.3-1220, dated Jan. 30, 2020, 10 Pages.

3GPP2 C.S0011-B; "Recommended Minimum Performance Standards for cdma2000® Spread Spectrum Mobile Stations"; TIA-98-E; (Dec. 13, 2002); Release B, Version 1, Revision E.

ADL5513; "1 MHz to 4 GHz, 80 dB Logarithmic Detector / Controller"; Data Sheet; (2008); 25 pages.

HMC713LP3E; "54 dB, Logarithmic Detector / Controller, 50—8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS Flash Microcontrollers"; Data Sheet; (2001); 218 pages.

* cited by examiner

SIGNAL BOOSTER FOR BOOSTING SIGNALS IN CONTIGUOUS BANDS

RELATED APPLICATIONS

The present application is a continuation-in-part of U.S. patent application Ser. No. 15/814,183 filed Nov. 15, 2017, which claims the benefit of U.S. Provisional Patent Application No. 62/422,512, filed Nov. 15, 2016, the entire specifications of which are hereby incorporated by reference in their entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
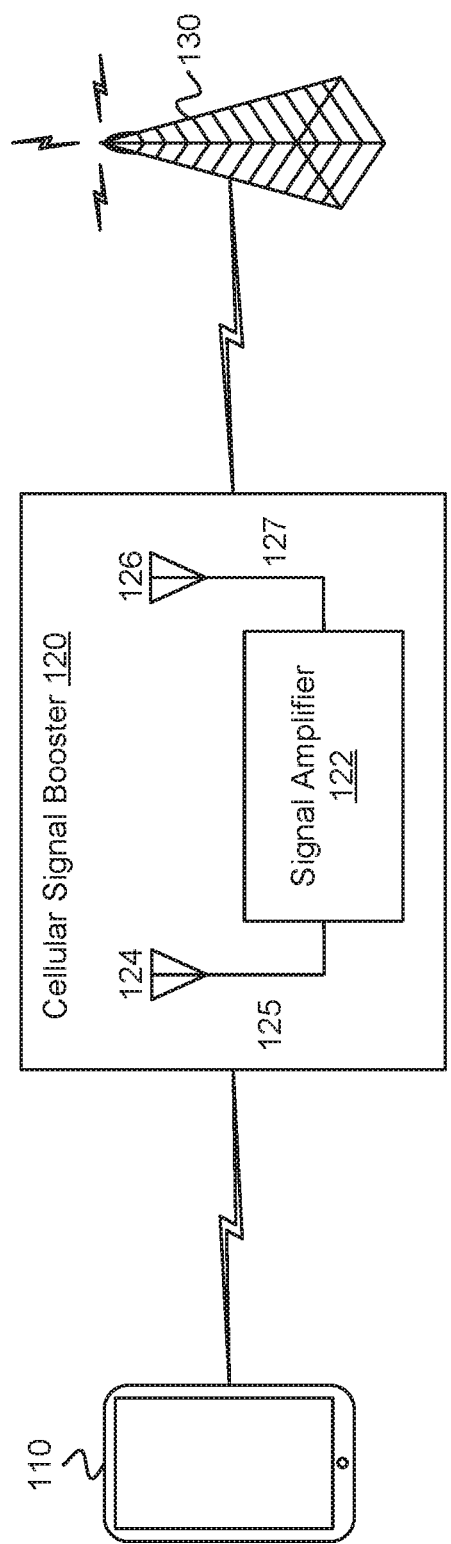
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated node antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature cofired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016-10).

In another configuration, the repeater 120 can improve the wireless connection between the wireless device 110 and the base station 130 (e.g., cell tower) or another type of wireless wide area network (WWAN) access point (AP) by amplifying desired signals relative to a noise floor. The repeater 120 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 120 can boost signals for 3GPP LTE Release 16.3.0 (September 2019) or other desired releases.

The repeater 120 can boost signals from the 3GPP Technical Specification (TS) 36.101 (Release 16 Sep. 2019) bands or LTE frequency bands. For example, the repeater 120 can boost signals from the LTE frequency bands: 2, 4, 5, 12, 13, 17, 25, and 26. In addition, the repeater 120 can boost selected frequency bands based on the country or region in which the repeater is used, including any of bands 1-85 or other bands, as disclosed in 3GPP TS 36.104 V16.3.0 (September 2019), and depicted in Table 1:

TABLE 1

| LTE Operating Band | Uplink (UL) operating band BS receive UE transmit $F_{UL\_low}$ - $F_{UL\_high}$ | Downlink (DL) operating band BS transmit UE receive $F_{DLlow}$ - $F_{DL\_high}$ | Duplex Mode |
|---|---|---|---|
| 1 | 1920 MHz - 1980 MHz | 2110 MHz - 2170 MHz | FDD |
| 2 | 1850 MHz - 1910 MHz | 1930 MHz - 1990 MHz | FDD |
| 3 | 1710 MHz - 1785 MHz | 1805 MHz - 1880 MHz | FDD |
| 4 | 1710 MHz - 1755 MHz | 2110 MHz - 2155 MHz | FDD |
| 5 | 824 MHz - 849 MHz | 869 MHz - 894 MHz | FDD |
| 6 (NOTE 1) | 830 MHz - 840 MHz | 875 MHz - 885 MHz | FDD |
| 7 | 2500 MHz - 2570 MHz | 2620 MHz - 2690 MHz | FDD |
| 8 | 880 MHz - 915 MHz | 925 MHz - 960 MHz | FDD |
| 9 | 1749.9 MHz -1784.9 MHz | 1844.9 MHz - 1879.9 MHz | FDD |
| 10 | 1710 MHz - 1770 MHz | 2110 MHz - 2170 MHz | FDD |
| 11 | 1427.9 MHz -1447.9 MHz | 1475.9 MHz - 1495.9 MHz | FDD |
| 12 | 699 MHz - 716 MHz | 729 MHz - 746 MHz | FDD |
| 13 | 777 MHz - 787 MHz | 746 MHz - 756 MHz | FDD |
| 14 | 788 MHz - 798 MHz | 758 MHz - 768 MHz | FDD |
| 15 | Reserved | Reserved | FDD |
| 16 | Reserved | Reserved | FDD |
| 17 | 704 MHz - 716 MHz | 734 MHz - 746 MHz | FDD |
| 18 | 815 MHz - 830 MHz | 860 MHz - 875 MHz | FDD |
| 19 | 830 MHz - 845 MHz | 875 MHz - 890 MHz | FDD |
| 20 | 832 MHz - 862 MHz | 791 MHz - 821 MHz | FDD |
| 21 | 1447.9 MHz - 1462.9 MHz | 1495.9 MHz - 1510.9 MHz | FDD |
| 22 | 3410 MHz - 3490 MHz | 3510 MHz - 3590 MHz | FDD |
| 23[1] | 2000 MHz - 2020 MHz | 2180 MHz - 2200 MHz | FDD |
| 24 | 1626.5 MHz -1660.5 MHz | 1525 MHz - 1559 MHz | FDD |
| 25 | 1850 MHz - 1915 MHz | 1930 MHz - 1995 MHz | FDD |
| 26 | 814 MHz - 849 MHz | 859 MHz - 894 MHz | FDD |
| 27 | 807 MHz - 824 MHz | 852 MHz - 869 MHz | FDD |
| 28 | 703 MHz - 748 MHz | 758 MHz - 803 MHz | FDD |
| 29 | N/A | 717 MHz - 728 MHz | FDD (NOTE 2) |
| 30 | 2305 MHz - 2315 MHz | 2350 MHz - 2360 MHz | FDD |
| 31 | 452.5 MHz - 457.5 MHz | 462.5 MHz - 467.5 MHz | FDD |
| 32 | N/A | 1452 MHz - 1496 MHz | FDD (NOTE 2) |
| 33 | 1900 MHz - 1920 MHz | 1900 MHz - 1920 MHz | TDD |
| 34 | 2010 MHz - 2025 MHz | 2010 MHz - 2025 MHz | TDD |
| 35 | 1850 MHz -1910 MHz | 1850 MHz - 1910 MHz | TDD |
| 36 | 1930 MHz - 1990 MHz | 1930 MHz - 1990 MHz | TDD |
| 37 | 1910 MHz - 1930 MHz | 1910 MHz - 1930 MHz | TDD |
| 38 | 2570 MHz - 2620 MHz | 2570 MHz - 2620 MHz | TDD |

TABLE 1-continued

| LTE Operating Band | Uplink (UL) operating band BS receive UE transmit $F_{UL\_low}$ - $F_{UL\_high}$ | Downlink (DL) operating band BS transmit UE receive $F_{DLlow}$ - $F_{DL\_high}$ | Duplex Mode |
|---|---|---|---|
| 39 | 1880 MHz - 1920 MHz | 1880 MHz - 1920 MHz | TDD |
| 40 | 2300 MHz - 2400 MHz | 2300 MHz - 2400 MHz | TDD |
| 41 | 2496 MHz - 2690 MHz | 2496 MHz - 2690 MHz | TDD |
| 42 | 3400 MHz - 3600 MHz | 3400 MHz - 3600 MHz | TDD |
| 43 | 3600 MHz - 3800 MHz | 3600 MHz - 3800 MHz | TDD |
| 44 | 703 MHz - 803 MHz | 703 MHz - 803 MHz | TDD |
| 45 | 1447 MHz - 1467 MHz | 1447 MHz - 1467 MHz | TDD |
| 46 | 5150 MHz - 5925 MHz | 5150 MHz - 5925 MHz | TDD (NOTE 3, NOTE 4) |
| 47 | 5855 MHz - 5925 MHz | 5855 MHz - 5925 MHz | TDD |
| 48 | 3550 MHz - 3700 MHz | 3550 MHz - 3700 MHz | TDD |
| 49 | 3550 MHz -3700 MHz | 3550 MHz - 3700 MHz | TDD (NOTE 8) |
| 50 | 1432 MHz - 1517 MHz | 1432 MHz - 1517 MHz | TDD |
| 51 | 1427 MHz - 1432 MHz | 1427 MHz - 1432 MHz | TDD |
| 52 | 3300 MHz - 3400 MHz | 3300 MHz - 3400 MHz | TDD |
| 53 | 2483.5 MHz - 2495 MHz | 2483.5 MHz - 2495 MHz | TDD |
| 65 | 1920 MHz - 2010 MHz | 2110 MHz - 2200 MHz | FDD |
| 66 | 1710 MHz - 1780 MHz | 2110 MHz - 2200 MHz | FDD (NOTE 5) |
| 67 | N/A | 738 MHz - 758 MHz | FDD (NOTE 2) |
| 68 | 698 MHz - 728 MHz | 753 MHz - 783 MHz | FDD |
| 69 | N/A | 2570 MHz - 2620 MHz | FDD (NOTE 2) |
| 70 | 1695 MHz - 1710 MHz | 1995 MHz - 2020 MHz | FDD[6] |
| 71 | 663 MHz - 698 MHz | 617 MHz - 652 MHz | FDD |
| 72 | 451 MHz - 456 MHz | 461 MHz - 466 MHz | FDD |
| 73 | 450 MHz - 455 MHz | 460 MHz - 465 MHz | FDD |
| 74 | 1427 MHz - 1470 MHz | 1475 MHz - 1518 MHz | FDD |
| 75 | N/A | 1432 MHz - 1517 MHz | FDD (NOTE 2) |
| 76 | N/A | 1427 MHz - 1432 MHz | FDD (NOTE 2) |
| 85 | 698 MHz - 716 MHz | 728 MHz - 746 MHz | FDD |
| 87 | 410 MHz - 415 MHz | 420 MHz - 425 MHz | FDD |
| 88 | 412 MHz - 417 MHz | 422 MHz - 427 MHz | FDD |

NOTE 1: Band 6, 23 are not applicable.
NOTE 2: Restricted to E-UTRA operation when carrier aggregation is configured. The downlink operating band is paired with the uplink operating band (external) of the carrier aggregation configuration that is supporting the configured Pcell.
NOTE 3: This band is an unlicensed band restricted to licensed-assisted operation using Frame Structure Type 3.
NOTE 4: Band 46 is divided into four sub-bands as in Table 5.5-1A.
NOTE 5: The range 2180 - 2200 MHz of the DL operating band is restricted to E-UTRA operation when carrier aggregation is configured.
NOTE 6: The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
NOTE 7: Void
NOTE 8: This band is restricted to licensed-assisted operation using Frame Structure Type 3.

In another configuration, the repeater 120 can boost signals from the 3GPP Technical Specification (TS) 38.104 (Release 16 Sep. 2019) bands or 5G frequency bands. In addition, the repeater 120 can boost selected frequency bands based on the country or region in which the repeater is used, including any of bands n1-n90 in frequency range 1 (FR1), n257-n261 in frequency range 2 (FR2), or other bands, as disclosed in 3GPP TS 38.104 V16.1.0 (September 2019), and depicted in Table 2 and Table 3:

TABLE 2

| NR operating band | Uplink (UL) operating band BS receive/UE transmit $F_{UL,low}$ - $F_{UL,high}$ | Downlink (DL) operating band BS transmit/UE receive $F_{DL,low}$ - $F_{DL,high}$ | Duplex mode |
|---|---|---|---|
| n1 | 1920 MHz - 1980 MHz | 2110 MHz - 2170 MHz | FDD |
| n2 | 1850 MHz - 1910 MHz | 1930 MHz - 1990 MHz | FDD |
| n3 | 1710 MHz - 1785 MHz | 1805 MHz - 1880 MHz | FDD |
| n5 | 824 MHz - 849 MHz | 869 MHz - 894 MHz | FDD |
| n7 | 2500 MHz - 2570 MHz | 2620 MHz - 2690 MHz | FDD |
| n8 | 880 MHz - 915 MHz | 925 MHz - 960 MHz | FDD |
| n12 | 699 MHz - 716 MHz | 729 MHz - 746 MHz | FDD |
| n14 | 788 MHz - 798 MHz | 758 MHz - 768 MHz | FDD |
| n18 | 815 MHz - 830 MHz | 860 MHz - 875 MHz | FDD |
| n20 | 832 MHz - 862 MHz | 791 MHz - 821 MHz | FDD |
| n25 | 1850 MHz - 1915 MHz | 1930 MHz - 1995 MHz | FDD |
| n28 | 703 MHz - 748 MHz | 758 MHz - 803 MHz | FDD |
| n29 | N/A | 717 MHz - 728 MHz | SDL |
| n30 | 2305 MHz - 2315 MHz | 2350 MHz - 2360 MHz | FDD |
| n34 | 2010 MHz - 2025 MHz | 2010 MHz - 2025 MHz | TDD |
| n38 | 2570 MHz - 2620 MHz | 2570 MHz - 2620 MHz | TDD |
| n39 | 1880 MHz - 1920 MHz | 1880 MHz - 1920 MHz | TDD |
| n40 | 2300 MHz - 2400 MHz | 2300 MHz - 2400 MHz | TDD |
| n41 | 2496 MHz - 2690 MHz | 2496 MHz - 2690 MHz | TDD |
| n48 | 3550 MHz - 3700 MHz | 3550 MHz - 3700 MHz | TDD |
| n50 | 1432 MHz - 1517 MHz | 1432 MHz - 1517 MHz | TDD |
| n51 | 1427 MHz - 1432 MHz | 1427 MHz - 1432 MHz | TDD |
| n65 | 1920 MHz - 2010 MHz | 2110 MHz - 2200 MHz | FDD |
| n66 | 1710 MHz - 1780 MHz | 2110 MHz - 2200 MHz | FDD |
| n70 | 1695 MHz - 1710 MHz | 1995 MHz - 2020 MHz | FDD |
| n71 | 663 MHz - 698 MHz | 617 MHz - 652 MHz | FDD |
| n74 | 1427 MHz - 1470 MHz | 1475 MHz - 1518 MHz | FDD |
| n75 | N/A | 1432 MHz - 1517 MHz | SDL |
| n76 | N/A | 1427 MHz - 1432 MHz | SDL |
| n77 | 3300 MHz - 4200 MHz | 3300 MHz - 4200 MHz | TDD |
| n78 | 3300 MHz - 3800 MHz | 3300 MHz - 3800 MHz | TDD |
| n79 | 4400 MHz - 5000 MHz | 4400 MHz - 5000 MHz | TDD |
| n80 | 1710 MHz - 1785 MHz | N/A | SUL |
| n81 | 880 MHz - 915 MHz | N/A | SUL |
| n82 | 832 MHz - 862 MHz | N/A | SUL |
| n83 | 703 MHz - 748 MHz | N/A | SUL |
| n84 | 1920 MHz - 1980 MHz | N/A | SUL |
| n86 | 1710 MHz - 1780 MHz | N/A | SUL |
| n89 | 824 MHz - 849 MHz | N/A | SUL |
| [n90] | 2496 MHz - 2690 MHz | 2496 MHz - 2690 MHz | TDD |

TABLE 3

| NR operating band | Uplink (UL) and Downlink (DL) operating band BS transmit/receive UE transmit/receive $F_{UL,low}$ - $F_{UL,high}$ $F_{DL,low}$ - $F_{DL,high}$ | Duplex mode |
|---|---|---|
| n257 | 26500 MHz - 29500 MHz | TDD |
| n258 | 24250 MHz - 27500 MHz | TDD |
| n260 | 37000 MHz - 40000 MHz | TDD |
| n261 | 27500 MHz - 28350 MHz | TDD |

For purposes of this application, a frequency band (e.g., band 12 (B12)) can refer to a 3GPP long term evolution (LTE) frequency band (e.g., 3GPP LTE Band 12) or a 3GPP fifth generation (5G) frequency band (e.g., 3GPP 5G band 12 (n12)). A frequency band can include a first direction (e.g., an uplink or a downlink) and a second direction (e.g., a downlink or an uplink). A first-direction band can include one of an uplink direction or a downlink direction and a second-direction band can include one of a downlink direction or an uplink direction, wherein the first-direction band can be different from the second-direction band.

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

Figure 2:
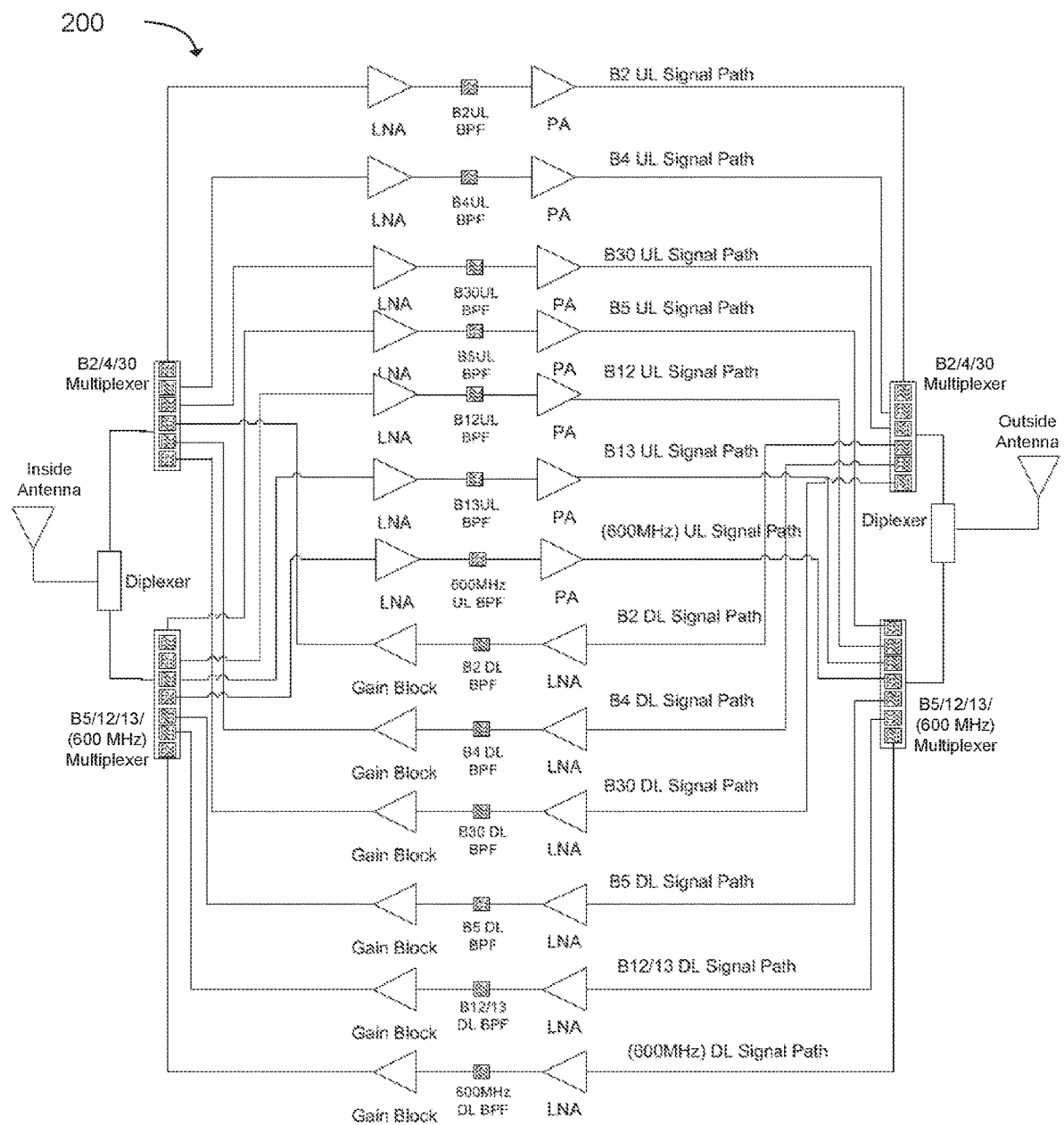
FIG. 2 illustrates a signal booster in accordance with an example.

FIG. 2 illustrates an exemplary signal booster 200. The signal booster 200 can include one or more uplink signal paths for selected bands, and the signal booster 200 can include one or more downlink signal paths for selected bands. The uplink signal paths can include one or more amplifiers and band pass filters to amplify uplink signals. Similarly, the downlink signal paths can include one or more amplifiers and band pass filters to amplify downlink signals.

In the example shown in FIG. 2, the signal booster 200 can have a first uplink signal path for band 2 (B2), a second uplink signal path for band 4 (B4), a third uplink signal path for band 30 (B30), a fourth uplink signal path for band 5 (B5), a fifth uplink signal path for band 12 (B12), a sixth uplink signal path for band 13 (B13), and a seventh uplink signal path for 600 megahertz (MHz). In uplink, B2 corresponds to a frequency range of 1850 MHz to 1910 MHz, B4 corresponds to a frequency range of 1710 MHz to 1755 MHz, B30 corresponds to a frequency range of 2305 MHz to 2315 MHz, B5 corresponds to a frequency range of 824 MHz to 849 MHz, B12 corresponds to a frequency range of 699 MHz to 716 MHz, and B13 corresponds to a frequency range of 777 MHz to 787 MHz.

In addition, the signal booster 200 can have a first downlink signal path for band 2 (B2), a second downlink signal path for band 4 (B4), a third downlink signal path for band 30 (B30), a fourth downlink signal path for band 5 (B5), a fifth downlink signal path for band 12 (B12) and band 13 (B13) (i.e., a combined signal path for both B12 and B13 in downlink), and a sixth downlink signal path for 600 megahertz (MHz). In downlink, B2 corresponds to a frequency range of 1930 MHz to 1990 MHz, B4 corresponds to a frequency range of 2110 MHz to 2155 MHz, B30 corresponds to a frequency range of 2350 MHz to 2360 MHz, B5 corresponds to a frequency range of 869 MHz to 894 MHz, B12 corresponds to a frequency range of 729 MHz to 746 MHz, and B13 corresponds to a frequency range of 746 MHz to 756 MHz.

In one example, the signal booster 200 can receive uplink signals from a mobile device (not shown) via an inside antenna coupled to the signal booster 200. An uplink signal can pass through a first diplexer, and then to a first uplink multiband filter (e.g., a first uplink B2/4/30 multiplexer). Then, the uplink signal can be provided to one of the uplink signal paths for B2, B4, B30, B5, B12, B13 or 600 MHz. The uplink signal paths can function to amplify the uplink signal using one or more amplifiers, and the uplink signal paths can function to filter the uplink signal using one or more band pass filters (BPFs). The uplink signal can be provided to a second uplink multiband filter (a second uplink B2/4/30 multiplexer), and then to a second diplexer. The uplink signal can be provided from the second diplexer to an outside antenna coupled to the signal booster 200. The outside antenna can transmit the uplink signal to a base station (not shown).

In another example, the signal booster 200 can receive downlink signals from the mobile device via the inside antenna coupled to the signal booster 200. A downlink signal can pass through the second diplexer, and then to a first downlink multiband filter (e.g., a first downlink B5/12/13/600 MHz multiplexer). Then, the downlink signal can be provided to one of the downlink signal paths for B2, B4, B30, B5, B12/13 or 600 MHz. The downlink signal paths can function to amplify the downlink signal using one or more amplifiers, and the downlink signal paths can function to filter the downlink signal using one or more band pass filters (BPFs). The downlink signal can be provided to a second downlink multiband filter (a second downlink B5/12/13/600 MHz multiplexer), and then to the first diplexer. The downlink signal can be provided from the first diplexer to the inside antenna coupled to the signal booster 200. The inside antenna can transmit the downlink signal to the mobile device.

In the example shown in FIG. 2, the signal booster 200 is a 7-band booster. However, the number of bands can increase beyond seven by adding additional filters and amplifiers in parallel. In other words, the signal booster 200 can boost signals in 7 bands, 9 bands, 11 bands, etc. For each signal path, a number of gain stages and filters can increase or decrease depending on a desired system performance. Additional components, such as RF detectors, bypass low noise amplifiers (LNAs), digital system amplifiers (DSAs), etc., can be added or removed to achieve a desired system performance. In one example, the signal booster 200 can employ splitters and/or diplexers. In addition, the signal booster 200 can operate on a band that is utilized for public safety.

Figure 3A:
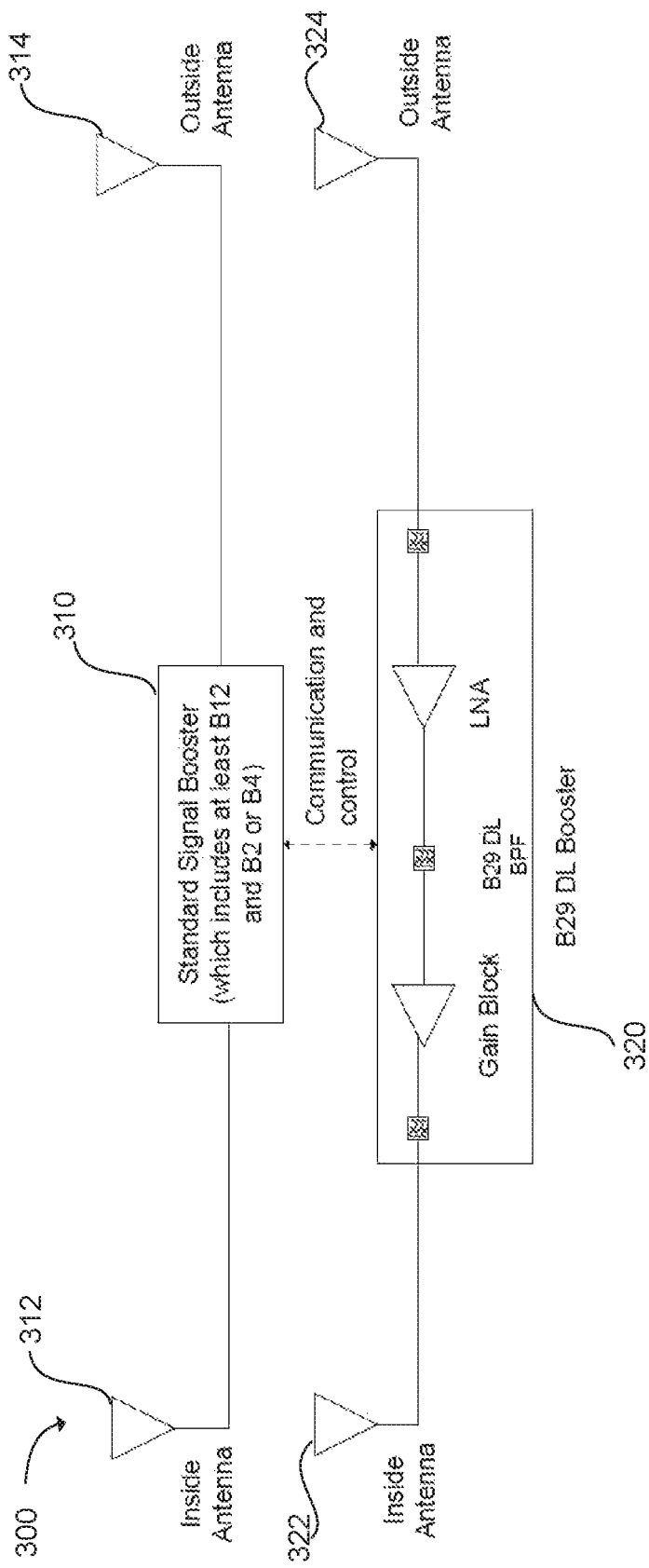
FIG. 3a illustrates a signal booster that boosts multiple frequency-contiguous bands in accordance with an example.

FIG. 3a illustrates an exemplary signal booster 300 that boosts signals multiple frequency-contiguous bands. The bands can be contiguous or "effectively" contiguous meaning that the bands are so close that filters for the separate bands can overlap with each other. The distance between each band, typically measured in frequency, can be referred to as a guard band, a band gap, or a gap. In one example, a relative gap is a bandwidth of the guard band or gap relative to or divided by a center frequency of the guard band or gap.

The signal booster 300 can include a primary signal booster 310 that is communicatively coupled to a secondary signal booster 320. In other words, the primary signal booster 310 and the secondary signal booster 320 can be part of a single package. The primary signal booster 310 can be coupled to a primary inside antenna 312 and a primary outside antenna 314. The secondary signal booster 320 can be coupled to a secondary inside antenna 322 and a secondary outside antenna 324. In other words, the primary signal booster 310 and the secondary signal booster 320 can each utilize a different set of antennas.

As an example, the primary signal booster 310 can include downlink and uplink signal paths for band 12 (B12), as well as band 2 (B2) or band 4 (B4). In uplink, B12 corresponds to a frequency range of 699 MHz to 716 MHz, and in downlink, B12 corresponds to a frequency range of 729 MHz to 746 MHz. The secondary signal booster 320 can include a downlink signal path for band 29 (B29). In downlink, B29 corresponds to a frequency range of 717 MHz to 728 MHz. Therefore, the downlink frequency range of B29 is directly adjacent to the uplink frequency range for B12 and the downlink frequency range of B12. Since the frequency ranges for B12 and B29 are contiguous, it is disadvantageous to have both B12 and B29 in the same signal booster unit due to filter overlap. Therefore, in the present technology, the primary signal booster 310 in the signal booster 300 can include B12 and the secondary signal booster 320 in the signal booster 300 can include B29, and the primary signal booster 310 can be communicatively coupled to the secondary signal booster 320. The physical isolation between the primary signal booster antennas and the secondary signal booster antennas can serve to mitigate the filter overlap. As a result, the signal booster 300 can boost signals in multiple frequency-contiguous bands (e.g., B12 and B29).

In one example, the secondary signal booster 320 (for B29) can communicate its received signal to the primary signal booster 310 via a communication link between the secondary signal booster 320 and the primary signal booster 310. The secondary signal booster 320 can communicate its received signal to the primary signal booster 310, such that the primary signal booster 310 can control for network protection. Based on the received signal from the secondary signal booster 320 (e.g., a received signal strength indication, or RSSI, associated with the received signal), the primary signal booster 310 can adjust a gain of an uplink signal path in order to protect the network. As an example, the primary signal booster 310 can communicate signals in the uplink using B2 or B4. In other words, B29 downlink can rely on B4 uplink or B2 uplink to close a network loop, and network protection for these uplink paths (i.e., B4 uplink or B2 uplink) can be based on an RSSI for the B29 downlink.

In one example, the primary and secondary inside antennas 312, 322 can be at a selected distance from the primary and secondary outside antennas 314, 324 to increase isolation between the antennas. The inside antennas 312, 322 and the outside antennas 314, 324 can be suitably isolated when there is greater isolation as compared to gain in the booster signal paths. The inside antennas 312, 322 and the outside antennas 314, 324 can be suitably isolated from each other since B29 downlink band pass filters can overlap with B12 band pass filters (both uplink and downlink).

In one configuration, the primary inside antenna 312 of the primary signal booster 310 can receive an uplink signal from a mobile device (not shown). The uplink signal can be provided to an uplink signal path (associated with the primary signal booster 310) for amplification and filtering of the uplink signal. The uplink signal can be provided to the primary outside antenna 314 of the primary signal booster 310, and the uplink signal can be communicated to a base station (not shown). In another configuration, the primary outside antenna 314 of the primary signal booster 310 can receive a downlink signal from the base station. The downlink signal can be provided to a downlink uplink signal path (associated with the primary signal booster) for amplification and filtering of the downlink signal. The downlink signal can be provided to the primary inside antenna 312 of the primary signal booster 310, and the downlink signal can be communicated to the mobile device.

In one configuration, the secondary outside antenna 324 of the secondary signal booster 320 (e.g., for B29) can receive a downlink signal from the base station. The downlink signal can be provided to a downlink uplink signal path (associated with the secondary signal booster 320) for amplification and filtering of the downlink signal. The downlink signal can be provided to the secondary inside antenna 322 of the secondary signal booster 320, and the downlink signal can be communicated to the mobile device.

In another example, two signals can be considered to be contiguous when one or more standard filters (e.g., SAW filters, BAW filters, FBAR filters, ceramic filters, or the like) cannot be configured to adequately isolate the two signals resulting in interference between the two signals. In one example, a SAW filter cannot be configured to have a roll off steep enough to separately filter two bands with a relative gap of less than 0.7%. In one example, a SAW filter can have a roll off steep enough to separately filter two bands with a relative gap of more than about 1.7% or 2.0%.

In another example, two signals can be considered to be contiguous with a relative gap of less than about 1.65%, 1.35%, 1.0%, 0.70%, or 0.50%. A relative gap can be a bandwidth of the guard band or gap relative to or divided by a center frequency of the guard band or gap. In one example, a 3 MHz gap at a center frequency of the gap of about 700 MHz can have a relative gap of about 0.4%.

In another example, a frequency gap of about 1 MHz between B12 UL and B29 DL can be associated with a relative gap of about 0.14% because the center frequency of the gap between 716 MHz and 717 MHz can be about 716.5 MHz. In this example, the ratio of the gap in MHz (e.g., 1 MHz) and the center frequency of the gap (e.g., 716.5 MHz) can be about 0.00140, which can be calculated to be the percentage of about 0.14%. A relative gap of about 0.14% is less than the exemplary thresholds for the relative gap (e.g., 1.65%, 1.35%, 1.0%, 0.70%, or 0.50%) for the two signals (e.g., B12 UL and B29 DL) to be contiguous.

In another example, the frequency range of a first band can be contiguous with the frequency range of a second band when a relative gap between the first band and the second band is less than a relative gap threshold for a selected filter type. In one example, the relative gap threshold for a selected filter type can be: 1.65%, 1.35%, 1.0%, 0.70%, or 0.50%. In one example, the selected filter type can be a surface acoustic wave (SAW) filter.

In another example, B12 uplink, having a frequency range of 699 MHz to 716 MHz and B12 DL, having a frequency range of 729 MHz to 746 MHz may not be considered as contiguous with each other because the band gap of 13 MHz is sufficiently wide that filters (e.g., SAW filters, BAW filters, FBAR filters, ceramic filters, and the like) can adequately isolate the frequency range of B12 UL and the frequency range of B12 DL. With a relative gap of 13 MHz/722.5 MHz, or 1.8%, SAW filter, BAW filters, FBAR filters, ceramic filters, and the like can be configured to have a roll off steep enough to separately filter the two bands. The relative gap of about 1.8% can be adequate to permit isolation between the two signals without substantial interference when using SAW, BAW, FBAR, or ceramic filters.

Figure 3B:
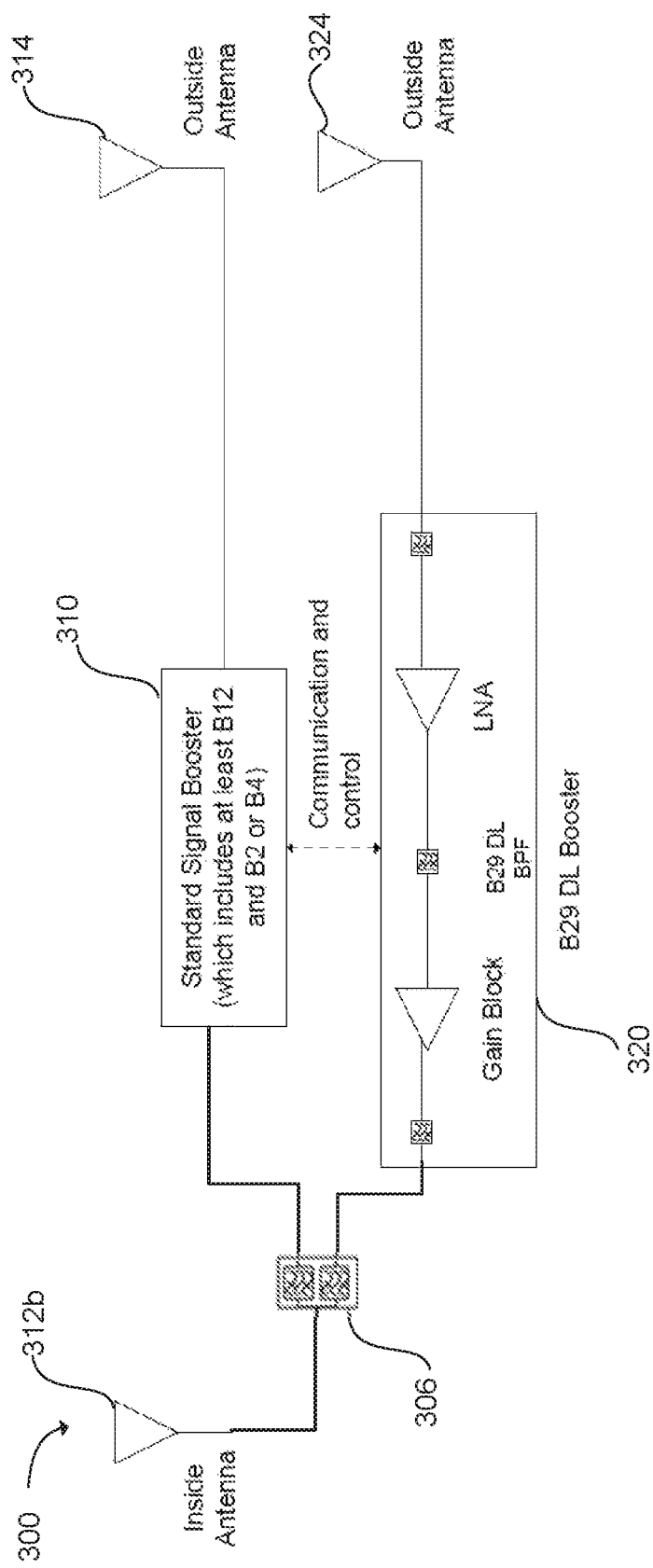
FIG. 3b illustrates a signal booster that boosts multiple frequency-contiguous bands in accordance with an example.

In another example, the primary inside antenna 312 and the secondary inside antenna 322 can be a single inside antenna 312b, as illustrated in FIG. 3b. In this example, the single inside antenna 312b can be configured to be coupled to a standard signal booster 310 and a B29 DL booster 320 via one or more diplexers 306, splitters, multiplexers, or duplexers. However, for a signal booster designed to use SAW filters, the primary outside antenna 314 and the secondary outside antenna 324 may not be combined into a single antenna because the B12 UL signal may not have adequate isolation from the B29 DL signal due to the 1 MHz guard-band (gap) between the B12 UL frequency range and the B29 DL frequency range. The relative gap of 0.14% between the B12 UL frequency range and the B29 DL frequency range is not large enough to enable a filter (e.g., a SAW filter) to roll off fast enough. Consequently, there can be interference in the signal booster 300 between the B12 UL signal and the B29 DL signal, resulting in the addition of the B12 UL signal and noise power into the B29 DL signal.

In another example, a final gain stage of a PA can amplify between 10 MHz and 6 GHz which can amplify the noise floor of the signal across the bandwidth. B29 DL with a frequency range between 717 MHz and 728 MHz can be amplified in the UL amplification and filtering path. In some scenarios, the uplink signal can be filtered with a duplexer and the noise power can be attenuated to reduce the UL signal amplification from raising the noise floor for the DL signal. In another example, B12 UL with a frequency range between 699 MHz and 716 MHz can be amplified in the DL amplification and filtering path. In some scenarios, the downlink signal can be filtered with a duplexer and the noise power can be attenuated to reduce the DL signal amplification from raising the noise floor for the UL signal. Consequently, the final gain stage of the PA in both the uplink signal path and the downlink signal path can amplify the noise in the UL signal, then the DL signal, and then continue on, resulting in an oscillation because the UL and DL paths are not sufficiently isolated due to the small relative gap of 0.14%.

In another example, separate donor ports can be configured to isolate the B12 UL signal from the B29 DL signal to prevent increases in the noise floor and oscillations. In another example, an RF frequency (e.g., 716.5 MHz) can be down-converted to an IF frequency to increase a relative gap between a first frequency range and a second frequency range. For example, a lower center frequency (e.g., 21.4 MHz) can result in a larger relative gap (e.g., 4.7% for a 1 MHz gap for a center frequency of 21.4 MHz). Separate donor ports can be configured to prevent the uplink signal from interfering with the downlink signal before the down-conversion from RF to IF can occur.

Figure 4:
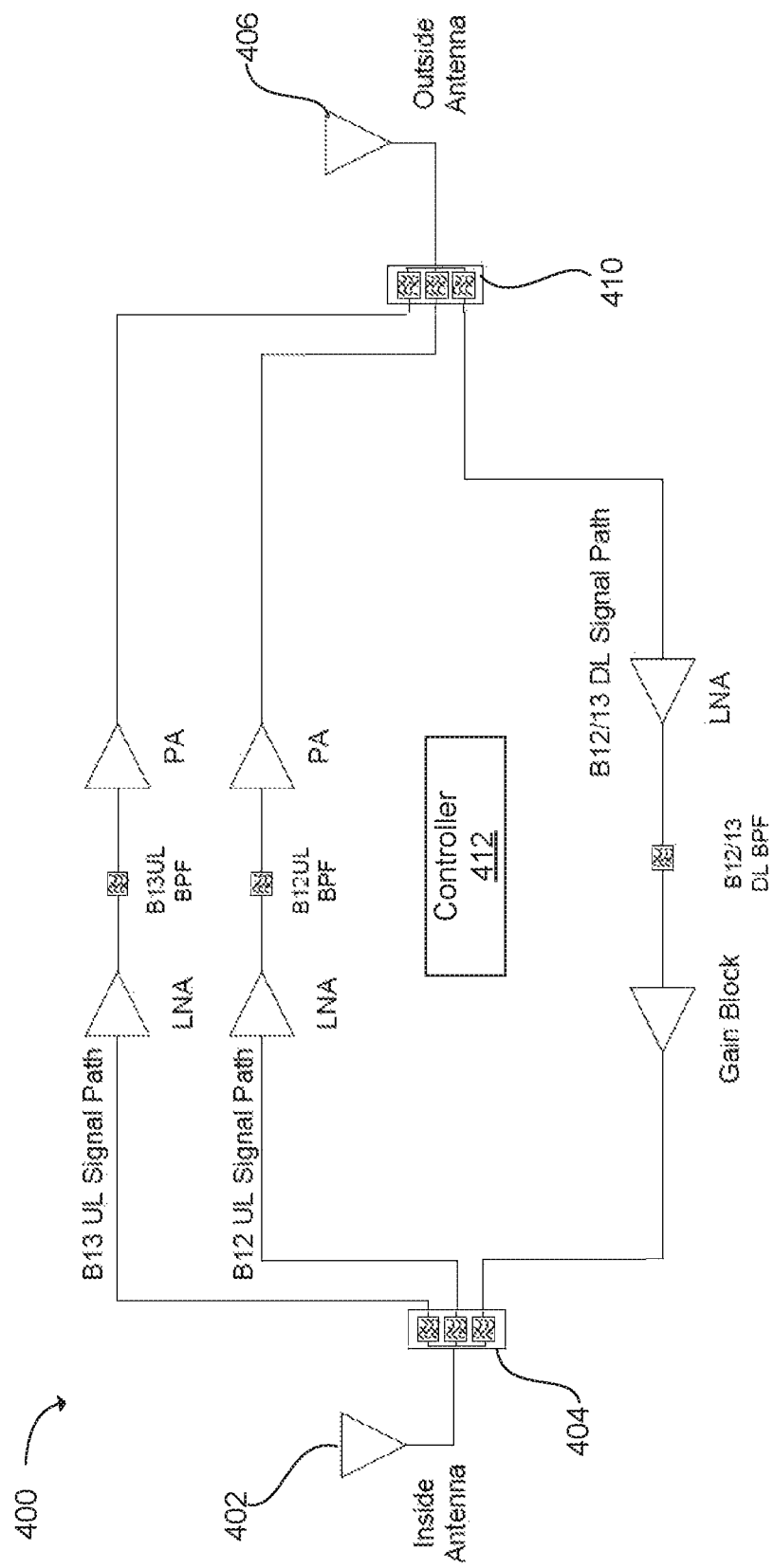
FIGS. 4 to 9 illustrate a signal booster configured to amplify uplink (UL) and downlink (DL) signals in accordance with an example.

FIG. 4 illustrates an exemplary signal booster 400. The signal booster 400 can include one or more uplink signal paths for selected bands, and the signal booster 400 can include one or more downlink signal paths for selected bands. The uplink signal paths can include one or more amplifiers and band pass filters to amplify uplink signals. Similarly, the downlink signal paths can include one or more amplifiers and band pass filters to amplify downlink signals.

In the example shown in FIG. 4, the signal booster 400 can have a first uplink signal path for band 12 (B12) and a second uplink signal path for B13. In uplink, B12 corresponds to a frequency range of 699 megahertz (MHz) to 716 MHz, and B13 corresponds to a frequency range of 777 MHz to 787 MHz. In addition, in this example, the signal booster 400 can have a downlink signal path for both B12 and B13. In other words, the downlink signal path can be a combined downlink signal path for both B12 and B13. In downlink, B12 corresponds to a frequency range of 729 MHz to 746 MHz, and B13 corresponds to a frequency range of 746 MHz to 756 MHz. In the downlink, B12 and B13 are spectrally adjacent to each other.

In one example, the signal booster 400 can receive uplink signals from a mobile device (not shown) via an inside antenna 402 coupled to the signal booster 400. An uplink signal can pass through a first multiband filter 404, and then the uplink signal can be provided to the first uplink signal path for B12 or the second uplink signal path for B13. The first and second uplink signal paths can perform amplification and filtering of the uplink signal. The uplink signal can be provided to a second multiband filter 410, and then the uplink signal can be provided to a base station (not shown) via an outside antenna 406 coupled to the signal booster 400.

In another example, the signal booster 400 can receive downlink signals from the base station via the outside antenna 406. A downlink signal can pass through the second multiband filter 410, and then the downlink signal can be provided to the combined downlink signal path for both B12 and B13. The combined downlink signal path can perform amplification and filtering of the downlink signal. The uplink downlink can be provided to the first multiband filter 404, and then the downlink signal can be provided to the mobile device via the inside antenna 402.

In one configuration, the signal booster 400 can include a controller 412. Generally speaking, the controller 412 can be configured to perform network protection for the signal booster 400. The controller 412 can perform network protection in accordance with Part 20 of the Federal Communications Commission (FCC) Consumer Booster Rules. The FCC Consumer Booster Rules necessitate that uplink signal paths and downlink signal are to work together for network protection. Network protection can be performed in order to protect a cellular network from overload or noise floor increase. The controller 412 can perform network protection by adjusting a gain or noise power for each band in the uplink transmission paths based on control information from each band in the downlink transmission paths. The control information from each band in the downlink transmission paths can include a received signal strength indication (RSSI) associated with downlink received signals. In other words, based on the RSSI of the downlink received signals traveling on the downlink transmission paths, the controller 412 can adjust (i.e., increase or decrease) the gain or noise power for the uplink transmission paths. By adjusting the gain or noise floor when performing the network protection, the signal booster 400 can prevent the network (e.g., base stations) from becoming overloaded with uplink signals from the signal booster 400 that exceed a defined threshold.

Figure 5:
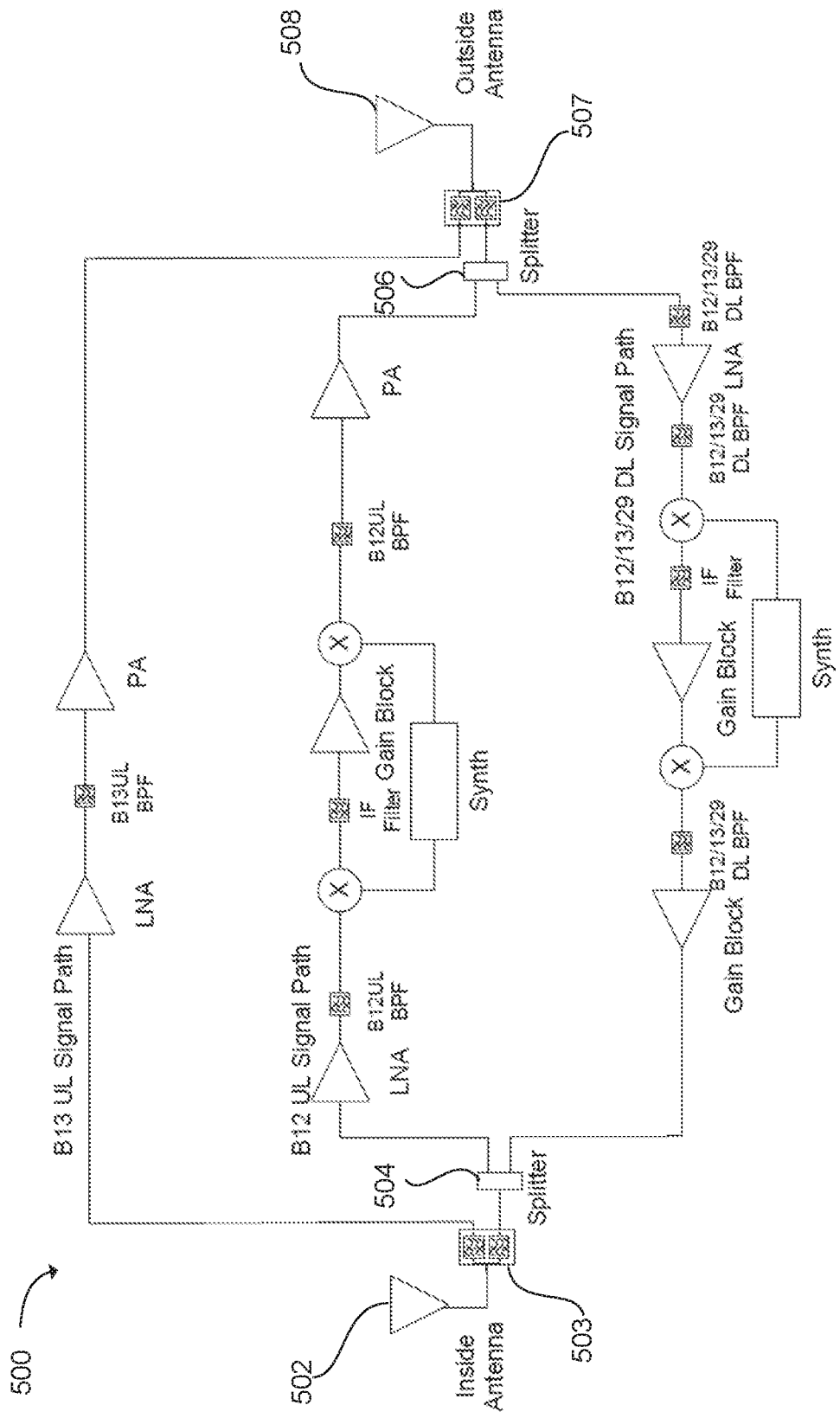

FIG. 5 illustrates an exemplary signal booster 500 configured to amplify uplink (UL) and downlink (DL) signals. The signal booster 500 can amplify signals using an intermediate frequency (IF)-enabled signal booster architecture. The signal booster 500 can include one or more uplink signal paths for selected bands, and the signal booster 500 can include one or more downlink signal paths for selected bands. The uplink signal paths can include one or more amplifiers and band pass filters to amplify uplink signals. Similarly, the downlink signal paths can include one or more amplifiers and band pass filters to amplify downlink signals. In addition, the uplink signal paths and the downlink signal paths can include IF filters and frequency synthesizers.

In the example shown in FIG. 5, the signal booster 500 can have a first uplink signal path for band 13 (B13) and a second uplink signal path for band 12 (B12). In uplink, B12 corresponds to a frequency range of 699 megahertz (MHz) to 716 MHz. In addition, in this example, the signal booster 500 can have a combined downlink signal path for band 12 (B12), band 13 (B13) and band 29 (B29). In downlink, B29 corresponds to a frequency range of 717 MHz to 728 MHz. Therefore, in this example, the signal booster 500 can boost signals in multiple frequency-contiguous bands (i.e., B12 and B29).

In one example, the signal booster 500 can receive uplink signals from a mobile device (not shown) via an inside antenna 502 coupled to the signal booster 500. An uplink signal can pass through a first multiband filter 503, and then the uplink signal can be provided to the first uplink signal path for B13, which can perform amplification and filtering of the uplink signal. The uplink signal can be provided to a second multiband filter 507, and then the uplink signal can be provided to a base station (not shown) via an outside antenna 508 coupled to the signal booster 500.

In another example, an uplink signal can pass through the first multiband filter 503, and then through a first splitter 504. Then, the uplink signal can be provided to the second uplink signal path for B12, which can perform amplification and filtering of the uplink signal. In addition, the second uplink signal path for B12 can include an IF filter and a frequency synthesizer to manipulate the uplink signal. For example, the IF filter can alter a frequency of the signal, and then the signal can be directed to another BPF. The uplink signal can be provided to a second splitter 506, and then to the second multiband filter 507. The uplink signal can be passed from the second multiband filter 507 to the outside antenna 508 for transmission to the base station.

In yet another example, the outside antenna 508 coupled to the signal booster 500 can receive a downlink signal from the base station. The downlink signal can be passed through the second multiband filter 507, and then to the second splitter 506. The downlink signal can be provided to the combined downlink signal path for B12, B13 and B29, which can perform amplification and filtering of the downlink signal. In addition, the combined downlink signal path for B12, B13 and B29 can include an IF filter and a frequency synthesizer to manipulate the downlink signal. For example, the IF filter can alter a frequency of the signal, and then the signal can be directed to another BPF. The downlink signal can be provided to the first splitter 504, and then to the first multiband filter 503. The first multiband filter 503 can provide the downlink signal to the inside antenna 502 coupled to the signal booster 500, and the downlink signal can be transmitted to the mobile device.

In one example, sharp roll-off of the IF filters can enable the second uplink signal path for B12 and the combined downlink signal path for B29 to operate simultaneously in the signal booster 500. The passband for each of the second uplink signal path and the combined downlink signal path can be reduced in order to create sufficient isolation. In another example, the first and second splitters 504, 506 can be replaced with first and second circulators. In yet another example, an UL power amplifier (PA) can be shared and feed directly into splitters(s) or circulator(s), which could result in minimal insertion loss, and a filter can be positioned after the UL PA (or not depending on design criteria).

In one example, the IF filters can be used to improve frequency selectivity. Filtering can involve separating out or extracting signals or components of a signal that are close together in frequency. With known filtering techniques, the filter's bandwidth can increase proportionately with the frequency. So a narrower bandwidth and more selectivity can be achieved by converting the signal to a lower IF and performing the filtering at that frequency.

In one example, a previously discussed, a frequency gap of about 1 MHz between B12 UL and B29 DL can be associated with a relative gap of about 0.14% because the center frequency of the gap between 716 MHz and 717 MHz can be about 716.5 MHz. In another example, an RF frequency (e.g., 716.5 MHz) can be down-converted to an IF frequency to increase a relative gap between a first frequency range and a second frequency range. For example, a lower center frequency (e.g., 21.4 MHz) can result in a larger relative gap (e.g., 4.7% for a 1 MHz gap for a center frequency of 21.4 MHz).

In one example, the B29 DL signal path can rely on a band 4 (B4) UL signal path or a band 2 (B2) UL signal path to close a network loop. Therefore, network protection for uplink paths for B2 and B4 can be based on an RSSI associated with a B29 DL signal path. Thus, the B2 UL gain and noise power can depend on the B2 DL RSSI, as well as the B29 DL RSSI (e.g., a worst case can be taken between the B2 DL RSSI and the B29 DL RSSI). Similarly, the B4 UL gain and noise power can depend on the B4 DL RSSI, as well as the B29 DL RSSI.

In one example, the signal booster 500 can include a downlink signal path and an uplink signal path for band 5 (B5), which can achieved using a 700/800 MHz diplexer, single input single output (SISO) filters, etc. In another example, the combined downlink signal path can use switched filters for RF power detection, such that the RF power detection can be performed on a single band basis rather than combined for all the bands (e.g., B12, B13 and B29). In yet another example, the signal booster 500 can employ either analog filters or digital filters.

Figure 6:
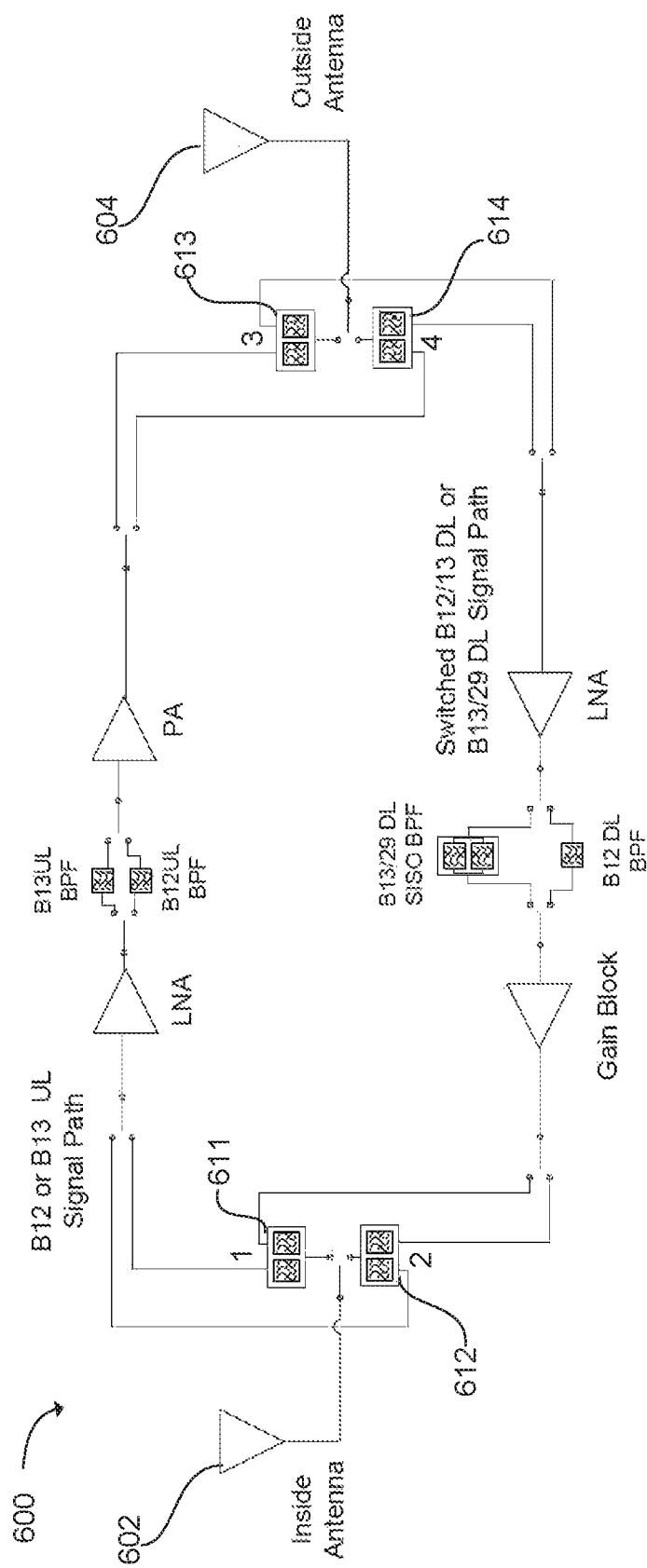

FIG. 6 illustrates an exemplary signal booster 600 configured to amplify uplink (UL) and downlink (DL) signals. The signal booster 600 can amplify signals using a switched booster architecture. The signal booster 600 can include an uplink signal path for selected bands, and the signal booster 600 can include a downlink signal path for selected bands. The uplink signal path and the downlink signal path can each include one or more switchable band pass filters (BPFs) and switchable multiband filters.

In the example shown in FIG. 6, the signal booster 600 can have an uplink signal path for band 12 (B12) or band 13 (B13). In other words, the uplink signal path can be switchable between B12 and B13. In addition, in this example, the signal booster 600 can have a downlink signal path for B13 and band 29 (B29), or the downlink signal path can be for B12. In other words, the downlink signal path can be switchable between B13/29 and B12. In addition, the uplink signal path for B12 or B13 can include one or more amplifiers (e.g., LNA and PA), and the downlink signal paths for B13/29 and B12 can include one or more amplifiers (e.g., a gain block and an LNA).

In uplink, B12 corresponds to a frequency range of 699 megahertz (MHz) to 716 MHz, and in downlink, B29 corresponds to a frequency range of 717 MHz to 728 MHz. Therefore, in this example, the signal booster 600 can boost signals in multiple frequency-contiguous bands (i.e., B12 and B29).

In one example, the signal booster 600 can receive uplink signals from a mobile device (not shown) via an inside antenna 602 coupled to the signal booster 600. An uplink signal can pass through a first switchable multiband filter 611 or a second switchable multiband filter 612, and then the uplink signal can be provided to the uplink signal path for B12 or B13. More specifically, when the uplink signal is passed through the first switchable multiband filter 611, the uplink signal can be passed to a switchable B12 UL BPF. When the uplink signal is passed through the second switchable multiband filter 612, the uplink signal can be passed to a switchable B13 UL BPF. The uplink signal can be passed through a third switchable multiband filter 613 or a fourth switchable multiband filter 614, and then to an outside antenna 604 coupled to the signal booster 600. The outside antenna 604 can transmit the uplink signal to a base station (not shown).

In another example, the signal booster 600 can receive downlink signals from the base station via the outside antenna 604 coupled to the signal booster 600. A downlink signal can pass through the third switchable multiband filter 613 or the fourth switchable multiband filter 614, and then the downlink signal can be provided to the downlink signal path for B12 or B13/29. More specifically, when the downlink signal is passed through the third switchable multiband filter 613, the downlink signal can be passed to a switchable B12 DL BPF (associated with the downlink signal path for B12). When the downlink signal is passed through the fourth switchable multiband filter 614, the downlink signal can be passed to a switchable B13/29 DL SISO BPF (associated with the downlink signal path for B13/29). The downlink signal can be passed through the first switchable multiband filter 611 or the second switchable multiband filter 612, and then to the inside antenna 602 coupled to the signal booster 600. The inside antenna 602 can transmit the downlink signal to the mobile device.

In one configuration, the switching can be controlled manually. Alternatively, the switching can be performed automatically by sensing UL and/or DL received signals, and a stronger path or weaker path can be switched to accordingly. In another example, the switching can be performed using a global positioning system (GPS) location. For example, certain geographical areas can have one band active while other bands are not active.

In one example, B29 DL can rely on band 4 (B4) UL or a band 2 (B2) UL to close a network loop. Therefore, network protection for B2 UL and B4 UL can be based on a B29 DL RSSI. Thus, the B2 UL gain and noise power can depend on the B2 DL RSSI, as well as the B29 DL RSSI (e.g., a worst case can be taken between the B2 DL RSSI and the B29 DL RSSI). Similarly, the B4 UL gain and noise power can depend on the B4 DL RSSI, as well as the B29 DL RSSI.

In one example, the B13 DL signal path and the B29 DL signal path can be separate to achieve increased performance. In another example, separate low noise amplifiers (LNAs) can be used on downlink, and then bands can be combined using a double input single output (DISO) filter, which can reduce noise figure from a switch. In yet another example, rather than using the B13/29 DL SISO BPF, a 716-756 MHz DL BPF can be used to cover B29/12/13, and a B12 notch filter can optionally be added. In a further example, with respect to the downlink and uplink signal paths, increased or reduced gain and filtering can be utilized depending on a desired coverage area.

Figure 7:
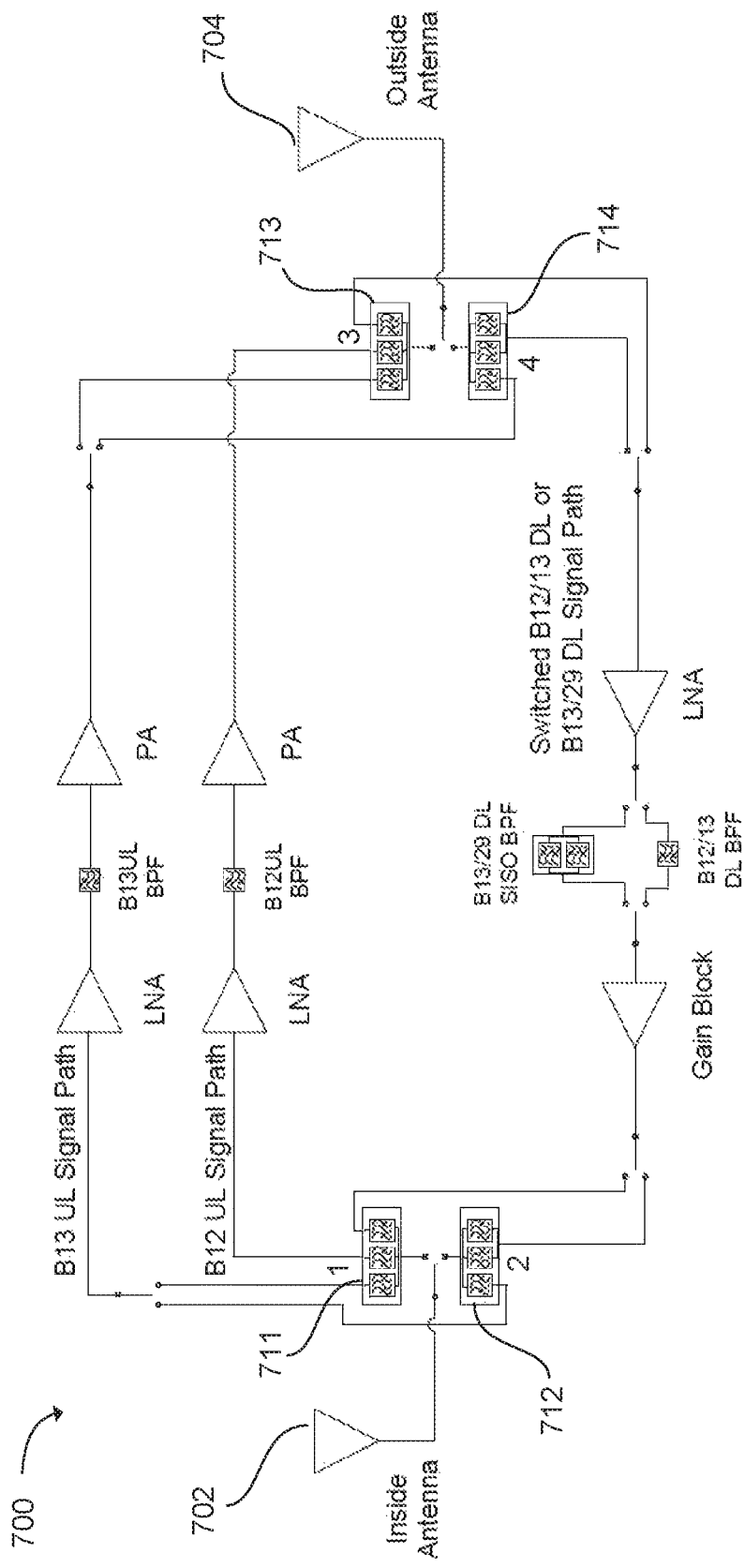

FIG. 7 illustrates an exemplary signal booster 700 configured to amplify uplink (UL) and downlink (DL) signals. The signal booster 700 can amplify signals using a switched booster architecture. The signal booster 700 can include multiple uplink signal paths for selected bands, and the signal booster 700 can include a downlink signal path for selected bands. The uplink signal paths and the downlink signal path can each include one or more switchable band pass filters (BPFs) and switchable multiband filters.

In the example shown in FIG. 7, the signal booster 700 can have a first uplink signal path for band 13 (B13) and a second uplink signal path for band 12 (B12). In addition, in this example, the signal booster 700 can have a downlink signal path for B13 and band 29 (B29), or the downlink signal path can be for B12 and B13. In other words, the downlink signal path can be switchable between B13/29 and B12/13. In addition, the uplink signal paths for B12 and B13, respectively, can include one or more amplifiers (e.g., LNA and PA), and the downlink signal paths for B13/29 and B12/13 can include one or more amplifiers (e.g., a gain block and an LNA).

In uplink, B12 corresponds to a frequency range of 699 megahertz (MHz) to 716 MHz, and in downlink, B29 corresponds to a frequency range of 717 MHz to 728 MHz. Therefore, in this example, the signal booster 700 can boost signals in multiple frequency-contiguous bands (i.e., B12 and B29).

In one example, the signal booster 700 can receive uplink signals from a mobile device (not shown) via an inside antenna 702 coupled to the signal booster 700. An uplink signal can pass through a first switchable multiband filter 711 or a second switchable multiband filter 712, and then the uplink signal can be provided to the first uplink signal path for B13 or the second uplink signal path for B12. More specifically, when the uplink signal is passed through the first switchable multiband filter 711, the uplink signal can be passed to the first uplink signal path for B13 or the second uplink signal path for B12. When the uplink signal is passed through the second switchable multiband filter 712, the uplink signal can be passed to the first uplink signal path for B13. The first uplink signal path for B13 can include multiple amplifiers (e.g., LNA and PA) and a B13 UL BPF, while the second uplink signal path for B12 can include multiple amplifiers (e.g., LNA and PA) and a B12 UL BPF. From the first uplink signal path for B13, the uplink signal can be passed to a third switchable multiband filter 713 or a fourth switchable multiband filter 714, and then to an outside antenna 704 coupled to the signal booster 700. Alternatively, from the second uplink signal path for B12, the uplink signal can be passed to the third switchable multiband filter 713, and then to the outside antenna 704 coupled to the signal booster 700. The outside antenna 704 can transmit the uplink signal to a base station (not shown).

In one example, the signal booster 700 can receive downlink signals from the base station via the outside antenna 704 coupled to the signal booster 700. A downlink signal can pass through the third switchable multiband filter 713 or the fourth switchable multiband filter 714, and then the downlink signal can be provided to the downlink signal path for B13/29 or B12/13. More specifically, when the downlink signal is passed through the third switchable multiband filter 713, the downlink signal can be passed to a switchable B12/13 DL BPF (associated with the downlink signal path for B12/13). When the downlink signal is passed through the fourth switchable multiband filter 714, the downlink signal can be passed to a switchable B13/29 DL SISO BPF (associated with the downlink signal path for B13/29). The downlink signal can be passed through the first switchable multiband filter 711 or the second switchable multiband filter 712, and then to the inside antenna 702 coupled to the signal booster 700. The inside antenna 702 can transmit the downlink signal to the mobile device.

In one configuration, the switching can be controlled manually. Alternatively, the switching can be performed automatically by sensing UL and/or DL received signals, and a stronger path or weaker path can be switched to accordingly. In another example, the switching can be performed using a global positioning system (GPS) location. For example, certain geographical areas can have one band active while other bands are not active.

In one example, B29 DL can rely on band 4 (B4) UL or a band 2 (B2) UL to close a network loop. Therefore, network protection for B2 UL and B4 UL can be based on a B29 DL RSSI.

In one example, the B13 DL signal path and the B29 DL signal path can be separate to achieve increased performance. In another example, separate low noise amplifiers (LNAs) can be used on downlink, and then bands can be combined using a double input single output (DISO) filter, which can reduce noise figure from a switch. In yet another example, rather than using the B13/29 DL SISO BPF, a 716-756 MHz DL BPF can be used to cover B29/12/13, and a B12 notch filter can optionally be added. In a further example, with respect to the downlink and uplink signal paths, increased or reduced gain and filtering can be utilized depending on a desired coverage area. In yet a further example, switched splitters or circulators on front end(s) of the signal booster 700 can replace switched triplexers.

Figure 8:
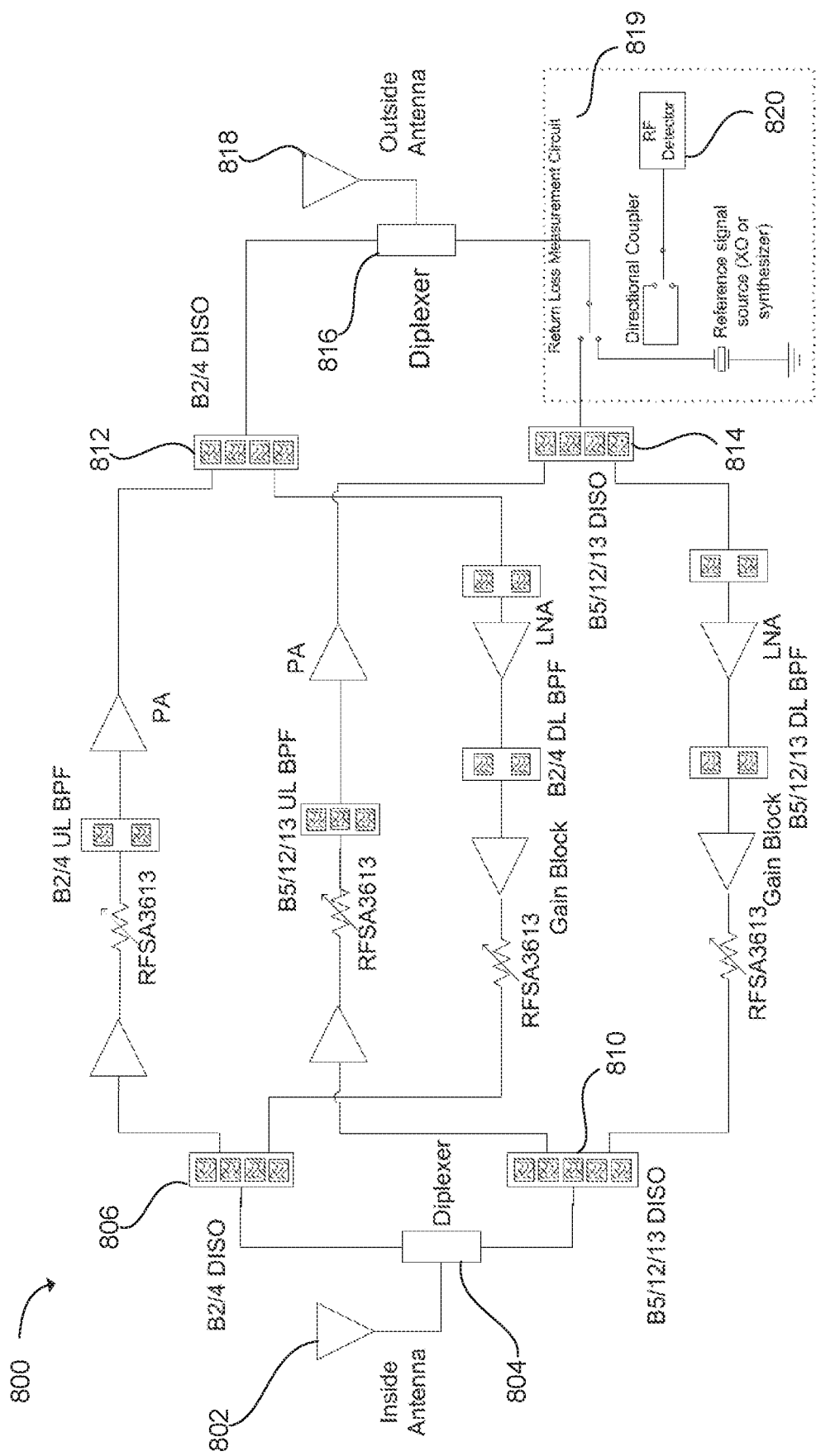

FIG. 8 illustrates an exemplary signal booster 800 configured to amplify uplink (UL) and downlink (DL) signals. In this example, the signal booster 800 can be a 5-band signal booster. The signal booster 800 can include a high band uplink signal path for selected bands, and the signal booster 800 can include a low band uplink signal path for selected bands. Similarly, the signal booster 800 can include a high band downlink signal path for selected bands, and the signal booster 800 can include a low band downlink signal path for selected bands. The uplink and downlink signal paths (both high band and low band) can include one or more amplifiers and band pass filters to amplify signals. The high band uplink and downlink signal paths can correspond to bands 2 and 4, and the low band uplink and downlink signal paths can correspond to bands 5, 12 and 13.

In one example, the signal booster 800 can receive uplink signals from a mobile device (not shown) via an inside antenna 802 coupled to the signal booster 800. An uplink signal can pass through a first diplexer 804, and then the uplink signal can be directed to a first multiband filter 806 (for B2/4) corresponding to a high band uplink signal path, or the uplink signal can be directed to a second multiband filter 810 (for B5/12/13) corresponding to a low band uplink signal path. If the uplink signal is directed to the first multiband filter 806 (for B2/4), the uplink signal can be provided to the high band uplink signal path for amplification and filtering of the uplink signal. The uplink signal can be provided to a third multiband filter 812 (for B2/4), or to a first circulator, and then to a second diplexer 816. On the other hand, if the uplink signal is directed to the second multiband filter 810 (for B5/12/13), the uplink signal can be provided to the low band uplink signal path for amplification and filtering of the uplink signal. The uplink signal can be provided to a fourth multiband filter 814 (for B5/12/13), or a second circulator, and then to the second diplexer 816. From the second diplexer 816, the uplink signal can be provided to an outside antenna 818 coupled to the signal booster 800. The outside antenna 818 can transmit the uplink signal to a base station (not shown).

In one example, the signal booster 800 can receive downlink signals from the base station via the outside antenna 818 coupled to the signal booster 800. A downlink signal can pass through the second diplexer 816. From the second diplexer 816, the downlink signal can be directed to a high band downlink signal path via the third multiband filter 812 (for B2/4) (or the first circulator), or the downlink signal can be directed to a low band downlink signal path via the fourth multiband filter 814 (for B5/12/13) (or the second circulator). In the first case, the downlink signal can be directed to the high band downlink signal path via the third multiband filter 812 (for B2/4) (or the first circulator) for amplification and filtering of the downlink signal, and then the downlink signal can be provided to the first multiband filter 806 (for B2/4) corresponding to a high band uplink signal path. Then, the downlink signal can be provided to the first diplexer 804. In the second case, the downlink signal can be directed to the low band downlink signal path via the fourth multiband filter 814 (for B5/12/13) (or the second circulator) for amplification and filtering of the downlink signal, and then the downlink signal can be provided to the second multiband filter 810 (for B5/12/13) corresponding to a low band uplink signal path. Then, the downlink signal can be provided to the first diplexer 804. From the first diplexer 804, the downlink signal can be provided to the inside antenna 802 for transmission to the mobile device.

In one example, with respect to the uplink and downlink signal paths (both high band and low band), a number of gain stages and filters can increase or decrease depending on a desired system performance. In another example, the signal booster 800 can employ splitters instead of the multiband filters. In yet another example, the multiband filters can be replaced with splitters or circulators.

In one configuration, the signal booster 800 can include a return loss measurement circuit 819, which can include a directional coupler, an RF detector 820 and a reference signal source. The signal booster 800 can operate favorably with the third and fourth multiband filters 812, 814 (or the first and second circulators) only when there is a defined amount of return loss in a coaxial cable and antenna. Thus, the return loss measurement circuit 819 can measure the return loss, and then determine whether or not the signal booster 800 can operate at a maximum performance level based on the return loss. When the signal booster 800 cannot operate at the maximum performance level based on the return loss, a notification can be generated for a user.

Figure 9:
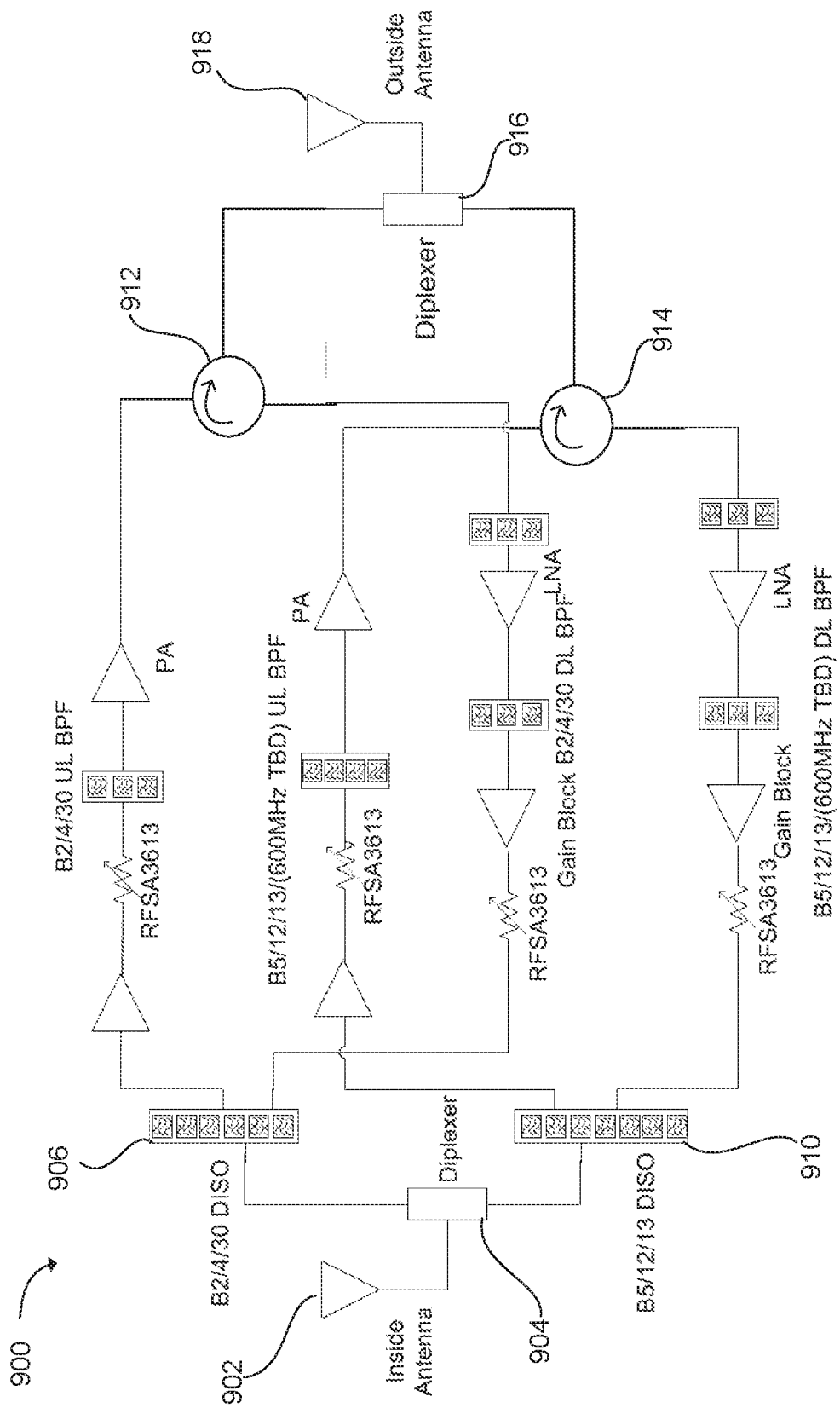

FIG. 9 illustrates an exemplary signal booster 900 configured to amplify uplink (UL) and downlink (DL) signals. In this example, the signal booster 900 can be a 7-band signal booster. The signal booster 900 can include a high band uplink signal path for selected bands, and the signal booster 900 can include a low band uplink signal path for selected bands. Similarly, the signal booster 900 can include a high band downlink signal path for selected bands, and the signal booster 900 can include a low band downlink signal path for selected bands. The uplink and downlink signal paths (both high band and low band) can include one or more amplifiers and band pass filters to amplify signals. The high band uplink and downlink signal paths can correspond to bands 2, 4 and 30, and the low band uplink and downlink signal paths can correspond to bands 5, 12, 13 and a 600 MHz frequency range.

In one example, the signal booster 900 can receive uplink signals from a mobile device (not shown) via an inside antenna 902 coupled to the signal booster 900. An uplink signal can pass through a first diplexer 904, and then the uplink signal can be directed to a first multiband filter 906 (for B2/4/30) corresponding to a high band uplink signal path, or the uplink signal can be directed to a second multiband filter 910 (for B5/12/13/600 MHz) corresponding to a low band uplink signal path. If the uplink signal is directed to the first multiband filter 906 (for B2/4/30), the uplink signal can be provided to the high band uplink signal path for amplification and filtering of the uplink signal. The uplink signal can be provided to a first circulator 912, and then to a second diplexer 916. On the other hand, if the uplink signal is directed to the second multiband filter 910 (for B5/12/13/600 MHz), the uplink signal can be provided to the low band uplink signal path for amplification and filtering of the uplink signal. The uplink signal can be provided to a second circulator 914, and then to the second diplexer 916. From the second diplexer 916, the uplink signal can be provided to an outside antenna 918 coupled to the signal booster 900. The outside antenna 918 can transmit the uplink signal to a base station (not shown).

In one example, the signal booster 900 can receive downlink signals from the base station via the outside antenna 918 coupled to the signal booster 900. A downlink signal can pass through the second diplexer 916. From the second diplexer 916, the downlink signal can be directed to a high band downlink signal path via the first circulator 912, or the downlink signal can be directed to a low band downlink signal path via the second circulator 914. In the first case, the downlink signal can be directed to the high band downlink signal path via the first circulator 912 for amplification and filtering of the downlink signal, and then the downlink signal can be provided to the first multiband filter 906 (for B2/4/30) corresponding to a high band uplink signal path. Then, the downlink signal can be provided to the first diplexer 904. In the second case, the downlink signal can be directed to the low band downlink signal path via the second circulator 914 for amplification and filtering of the downlink signal, and then the downlink signal can be provided to the second multiband filter 910 (for B5/12/13/600 MHz) corresponding to a low band uplink signal path. Then, the downlink signal can be provided to the first diplexer 904. From the first diplexer 904, the downlink signal can be provided to the inside antenna 902 for transmission to the mobile device.

Figure 10:
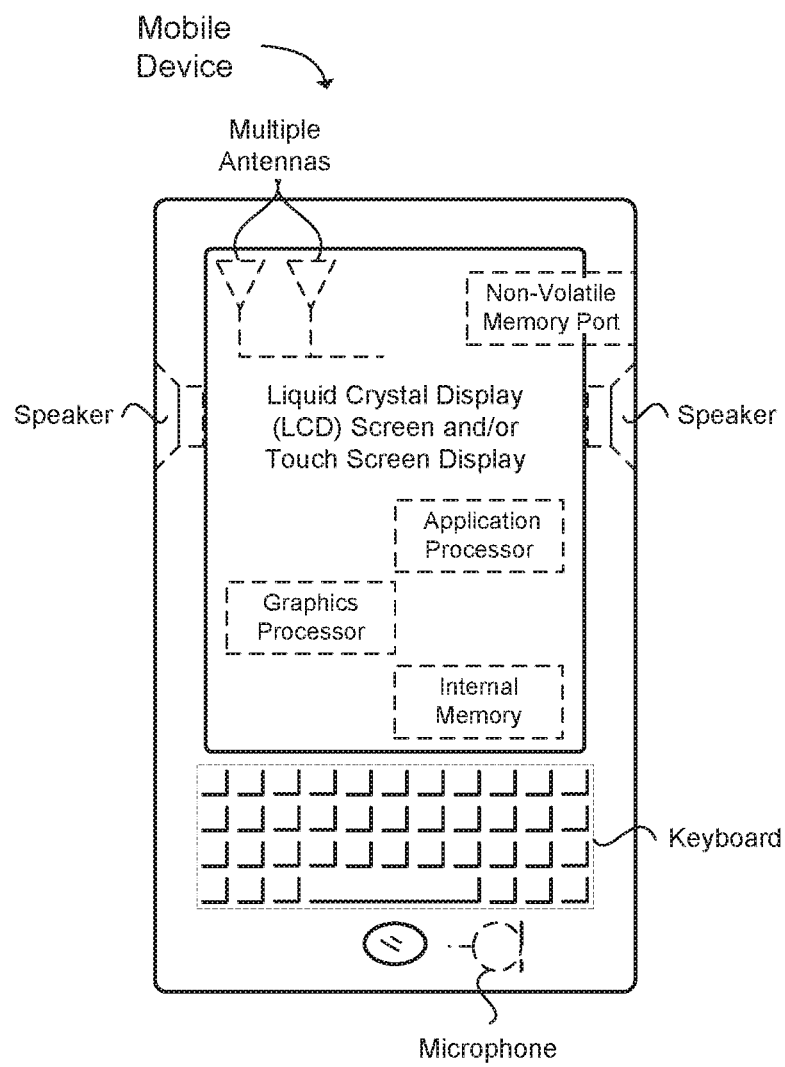
FIG. 10 illustrates a wireless device in accordance with an example.

FIG. 10 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a signal booster, comprising: a first signal booster configured to amplify signals in a first band; and a second signal booster communicatively coupled to the first signal booster, wherein the second signal booster is configured to amplify signals in a second band, and a frequency range of the second band is contiguous with a frequency range of the first band.

Example 2 includes the signal booster of Example 1, wherein the signal booster is operable to boost signals in multiple frequency-contiguous bands using the first signal booster that is physically isolated from the second signal booster within the signal booster.

Example 3 includes the signal booster of any of Examples 1 to 2, wherein the first signal booster comprises: an uplink signal path configured to amplify and filter signals in the first band; and a downlink signal path configured to amplify and filter signals in the first band.

Example 4 includes the signal booster of any of Examples 1 to 3, wherein the second signal booster includes a downlink signal path configured to amplify and filter signals in the second band.

Example 5 includes the signal booster of any of Examples 1 to 4, wherein the first band is band 12 (B12) and the second band is band 29 (B29), wherein B12 corresponds to a frequency range of 699 megahertz (MHz) to 716 MHz in an uplink and a frequency range of 729 MHz to 746 MHz in a downlink, and B29 corresponds to a frequency range of 717 MHz to 728 MHz in a downlink.

Example 6 includes the signal booster of any of Examples 1 to 5, wherein the first signal booster comprises: a first inside antenna configured to communicate signals with a mobile device; and a first outside antenna configured to communicate signals with a base station.

Example 7 includes the signal booster of any of Examples 1 to 6, wherein the second signal booster comprises: a second inside antenna configured to communicate signals with a mobile device; and a second outside antenna configured to communicate signals with a base station.

Example 8 includes the signal booster of any of Examples 1 to 7, wherein the first signal booster further comprises a controller operable to perform network protection.

Example 9 includes the signal booster of any of Examples 1 to 8, wherein the controller is configured to: determine a received signal strength indication (RSSI) of a received signal communicated from the second signal booster; and adjust a gain of an uplink signal path in the first signal booster based on the RSSI of the received signal in order to perform the network protection.

Example 10 includes the signal booster of any of Examples 1 to 9, wherein the uplink signal path is associated with band 2 (B2) or band 4 (B4), and the RSSI of the received signal is associated with band 29 (B29).

Example 11 includes the signal booster of any of Examples 1 to 10, wherein the first signal booster antennas are positioned at a selected distance from the second signal booster antennas to increase physical isolation between the first signal booster antennas and the second signal booster antennas, wherein the physical isolation serves to mitigate an overlap between one or more band pass filters in the first signal booster and the second signal booster.

Example 12 includes the signal booster of any of Examples 1 to 11, wherein the first signal booster and the second signal booster are included in a single form factor, and the first signal booster includes a first set of antenna ports and the second signal booster includes a second set of antenna ports.

Example 13 includes a cellular signal booster, comprising: a first signal booster, comprising: a first cellular signal amplifier configured to amplify signals in a first band; a first inside antenna communicatively coupled to the first cellular signal amplifier; and a first outside antenna communicatively coupled to the first cellular signal amplifier; and a second signal booster communicatively coupled to the first signal booster, the second signal booster comprising: a second cellular signal amplifier configured to amplify signals in a second band, and a frequency range of the second band is contiguous with a frequency range of the first band; a second inside antenna communicatively coupled to the second cellular signal amplifier; and a second outside antenna communicatively coupled to the second cellular signal amplifier.

Example 14 includes the cellular signal booster of Example 13, wherein the cellular signal booster is operable to boost signals in multiple frequency-contiguous bands using the first signal booster antennas that are physically isolated from the second signal booster antennas within the cellular signal booster.

Example 15 includes the cellular signal booster of any of Examples 13 to 14, wherein the first signal booster comprises: an uplink signal path configured to amplify and filter signals in the first band; and a downlink signal path configured to amplify and filter signals in the first band.

Example 16 includes the cellular signal booster of any of Examples 13 to 15, wherein the second signal booster includes a downlink signal path configured to amplify and filter signals in the second band.

Example 17 includes the cellular signal booster of any of Examples 13 to 16, wherein the first band is band 12 (B12) and the second band is band 29 (B29), wherein B12 corresponds to a frequency range of 699 megahertz (MHz) to 716 MHz in an uplink and a frequency range of 729 MHz to 746 MHz in a downlink, and B29 corresponds to a frequency range of 717 MHz to 728 MHz in a downlink.

Example 18 includes a signal repeater comprising: a first signal repeater configured to amplify signals in a first band; and a second signal repeater communicatively coupled to the first signal repeater, wherein the second signal repeater is configured to amplify signals in a second band, and a frequency range of the second band is contiguous with a frequency range of the first band.

Example 19 includes the signal repeater of Example 18, wherein the signal repeater is operable to boost signals in multiple frequency-contiguous bands using the first signal repeater that is physically isolated from the second signal repeater within the signal repeater.

Example 20 includes the signal repeater of any of Examples 18 to 19, wherein: the first signal repeater comprises one or more uplink signal paths and one or more downlink signal paths; and the second signal comprises at least one downlink signal path.

Example 21 includes the signal repeater of any of Examples 18 to 20, wherein the first band is band 12 (B12) and the second band is band 29 (B29), wherein B12 corresponds to a frequency range of 699 megahertz (MHz) to 716 MHz in an uplink and a frequency range of 729 MHz to 746 MHz in a downlink, and B29 corresponds to a frequency range of 717 MHz to 728 MHz in a downlink.

Example 22 includes the signal repeater of any of Examples 18 to 21, wherein the first signal repeater further comprises a controller operable to: determine a received signal strength indication (RSSI) of a received signal communicated from the second signal repeater; and adjust a gain of an uplink signal path in the first signal repeater based on the RSSI of the received signal in order to perform network protection.

Example 23 includes a signal booster, comprising: a first amplification and filtering path operable to amplify and filter signals in a first band; and a second amplification and filtering path operable to amplify and filter signals in a second band, wherein a frequency range of the second band is contiguous with a frequency range of the first band.

Example 24 includes the signal booster of Example 23, wherein: the first amplification and filtering path includes a first intermediate frequency (IF) filter to shift a frequency of a first signal, and the first signal with a shifted frequency is passed through a first band pass filter (BPF) on the first amplification and filtering path; and the second amplification and filtering path includes a second intermediate frequency (IF) filter to shift a frequency of a second signal, and the second signal with a shifted frequency is passed through a second band pass filter (BPF) on the second amplification and filtering path.

Example 25 includes the signal booster of any of Examples 23 to 24, wherein the first amplification and filtering path and the second amplification and filtering path include one or more switchable band pass filters (BPFs).

Example 26 includes the signal booster of any of Examples 23 to 25, wherein: a signal in the first band is directed to a first switchable BPF in the first amplification and filtering path, and the first switchable BPF is associated with the first band; and a signal in the second band is directed to a second switchable BPF in the first amplification and filtering path, and the second switchable BPF is associated with the second band.

Example 27 includes the signal booster of any of Examples 23 to 26, wherein the one or more BPFs are switched on or off depending on a geographical location of the signal booster.

Example 28 includes the signal booster of any of Examples 23 to 27, wherein the first band is band 12 (B12) and the second band is band 29 (B29), wherein B12 corresponds to a frequency range of 699 megahertz (MHz) to 716 MHz in an uplink and a frequency range of 729 MHz to 746 MHz in a downlink, and B29 corresponds to a frequency range of 717 MHz to 728 MHz in a downlink.

Example 29 includes the signal booster of any of Examples 23 to 28, further comprising: an inside antenna configured to transmit signals to a mobile device; and an outside antenna configured to transmit signals to a base station, wherein the first amplification and filtering path is coupled between the inside antenna and the outside antenna, and the second amplification and filtering path is coupled between the inside antenna and the outside antenna.

Example 30 includes a signal booster, comprising: an inside antenna; an outside antenna; a selected number of downlink amplification and filtering paths for a selected number of bands, the downlink amplification and filtering paths being positioned in between the inside antenna and the outside antenna; and a selected number of uplink amplification and filtering paths for a selected number of bands, the uplink amplification and filtering paths being positioned in between the inside antenna and the outside antenna.

Example 31 includes the signal booster of Example 30, further comprising: a first diplexer communicatively coupled to the inside antenna; and a second diplexer communicatively coupled to the outside antenna.

Example 32 includes the signal booster of any of Examples 30 to 31, further comprising: one or more first multiplexers communicatively coupled to the first diplexer; and one or more second multiplexers communicatively coupled to the second diplexer.

Example 33 includes the signal booster of any of Examples 30 to 32, further comprising: the selected number of downlink amplification and filtering paths is for at least 7 bands; and the selected number of uplink amplification and filtering paths is for at least 7 bands.

Example 34 includes a signal booster, comprising: an inside antenna; an outside antenna; a first double-input single-output (DISO) filter communicatively coupled to the inside antenna; a second DISO filter communicatively coupled to the outside antenna; and one or more amplification and filtering paths for a selected number of bands, the one or more amplification and filtering paths being communicatively coupled to the first DISO filter and the second DISO filter.

Example 35 includes the signal booster of Example 34, wherein each amplification and filtering path includes at least one single-input single-output (SISO) filter.

Example 36 includes the signal booster of any of Examples 34 to 35, further comprising: a return loss measurement circuit operable to measure a return loss in a coaxial cable of the signal booster.

Example 37 includes the signal booster of any of Examples 34 to 36, further comprising a controller configured to: determine when the return loss is above a defined threshold; and generate a notification indicating that the return loss is above the defined threshold.

Example 38 includes the signal booster of any of Examples 34 to 36, wherein the return loss measurement circuit includes a directional coupler, a radio frequency (RF) detector and a reference signal source.

Example 39 includes a signal booster, comprising: a first signal booster configured to amplify signals in a first band in a first direction, wherein the first signal booster includes a first antenna port and a second antenna port, wherein: the first antenna port is configured to communicate signals with a first antenna for communication with a mobile device; and the second antenna port is configured to communicate signals with a second antenna for communication with a base station; and a second signal booster communicatively coupled to the first signal booster, wherein the second signal booster is configured to amplify signals in a second band in a second direction, and wherein the second signal booster includes a third antenna port and a fourth antenna port, wherein: the third antenna port is configured to communicate signals with a third antenna for communication with the mobile device; and the fourth antenna port is configured to communicate signals with a fourth antenna for communication with the base station; and wherein a frequency range of the second band with the second-direction is contiguous with a frequency range of the first band with the first direction.

Example 40 includes the signal booster of Example 39, wherein the frequency range of the second band with the second-direction is contiguous with the frequency range of the first band with the first-direction when a relative gap between the first band and the second band is less than a relative gap threshold for a selected filter type.

Example 41 includes the signal booster of Example 40, wherein the relative gap threshold is 1.65%, 1.35%, 1.0%, 0.70%, or 0.50%.

Example 42 includes the signal booster of Example 40, wherein the selected filter type is a surface acoustic wave (SAW) filter.

Example 43 includes the signal booster of Example 40, wherein the first direction is an uplink direction and the second direction is a downlink direction.

Example 44 includes the signal booster of Example 39, wherein the signal booster is operable to boost signals in multiple frequency-contiguous bands using the first signal booster that is physically isolated from the second signal booster within the signal booster.

Example 45 includes the signal booster of Example 39, wherein the first signal booster comprises: an uplink signal path configured to amplify and filter signals in the first band; and a downlink signal path configured to amplify and filter signals in the first band.

Example 46 includes the signal booster of Example 39, wherein the second signal booster includes a downlink signal path configured to amplify and filter signals in the second band.

Example 47 includes the signal booster of Example 39, wherein the first band is band 12 (B12) and the second band is band 29 (B29), wherein B12 corresponds to a frequency range of 699 megahertz (MHz) to 716 MHz in an uplink and a frequency range of 729 MHz to 746 MHz in a downlink, and B29 corresponds to a frequency range of 717 MHz to 728 MHz in a downlink.

Example 48 includes the signal booster of Example 39, wherein: the first antenna is a server antenna that is configured to be communicatively coupled to the first antenna port; and the second antenna is a donor antenna that is configured to be communicatively coupled to the second antenna port.

Example 49 includes the signal booster of Example 39, wherein: the third antenna is a server antenna that is configured to be communicatively coupled to the third antenna port; and the fourth antenna is a donor antenna that is configured to be communicatively coupled to the fourth antenna port.

Example 50 includes the signal booster of Example 39, wherein the first signal booster further comprises a controller operable to perform network protection.

Example 51 includes the signal booster of Example 50, wherein the controller is configured to: determine a received signal strength indication (RSSI) of a received signal communicated from the second signal booster; and adjust a gain of an uplink signal path in the first signal booster based on the RSSI of the received signal in order to perform the network protection.

Example 52 includes the signal booster of Example 51, wherein the uplink signal path is associated with band 2 (B2) or band 4 (B4), and the RSSI of the received signal is associated with band 29 (B29).

Example 53 includes the signal booster of Example 39, wherein first antenna and the second antenna are positioned at a selected distance from the third antenna and the fourth antenna to increase physical isolation between the first and second antennas and the third and fourth antennas, wherein the physical isolation serves to mitigate an overlap between one or more band pass filters in the first signal booster and the second signal booster.

Example 54 includes the signal booster of Example 39, wherein the first signal booster and the second signal booster are included in a single form factor, and the first signal booster includes a first set of antenna ports and the second signal booster includes a second set of antenna ports.

Example 55 includes the signal booster of Example 39, wherein: the first antenna port is further configured to receive an unamplified uplink signal from the mobile device and transmit an amplified downlink signal to the mobile device; the second antenna port is further configured to receive an unamplified downlink signal from the base station and transmit an amplified uplink signal to the base station; the third antenna port is further configured to receive an unamplified uplink signal from the mobile device and transmit an amplified downlink signal to the mobile device; and the fourth antenna port is further configured to receive an unamplified downlink signal from the base station and transmit an amplified uplink signal to the base station.

Example 56 includes a cellular signal booster, comprising: a first signal booster, comprising: a first cellular signal amplifier configured to amplify signals in a first band in a first-direction; a first antenna port communicatively coupled to the first cellular signal amplifier; a second antenna port communicatively coupled to the first cellular signal amplifier; and an uplink signal path of the first cellular signal amplifier that is configured to amplify and filter signals in the first band; and a second signal booster communicatively coupled to the first signal booster, the second signal booster comprising: a second cellular signal amplifier configured to amplify signals in a second band in a second-direction, and a frequency range of the second band with the second direction is contiguous with a frequency range of the first band with the first direction; a third antenna port communicatively coupled to the second cellular signal amplifier; a fourth antenna port communicatively coupled to the second cellular signal amplifier; and a downlink signal path of the second cellular signal amplifier that is configured to amplify and filter signals in the second band.

Example 57 includes the signal booster of Example 56, wherein the frequency range of the second band with the second-direction is contiguous with the frequency range of the first band with the first-direction when a relative gap between the first band and the second band is less than a relative gap threshold for a selected filter type.

Example 58 includes the signal booster of Example 57, wherein the relative gap threshold is 1.65%, 1.35%, 1.0%, 0.70%, or 0.50%.

Example 59 includes the signal booster of Example 57, wherein the selected filter type is a surface acoustic wave (SAW) filter.

Example 60 includes the signal booster of Example 57, wherein the first direction is an uplink direction and the second direction is a downlink direction.

Example 61 includes the cellular signal booster of Example 56, wherein the cellular signal booster is operable to boost signals in multiple frequency-contiguous bands using first signal booster antennas that are physically isolated from second signal booster antennas within the cellular signal booster.

Example 62 includes the cellular signal booster of Example 56, wherein the first signal booster comprises a downlink signal path configured to amplify and filter signals in the first band.

Example 63 includes the cellular signal booster of Example 56, wherein the second signal booster includes an uplink signal path configured to amplify and filter signals in the second band.

Example 64 includes the cellular signal booster of Example 56, wherein the first band is band 12 (B12) and the second band is band 29 (B29), wherein B12 corresponds to a frequency range of 699 megahertz (MHz) to 716 MHz in an uplink and a frequency range of 729 MHz to 746 MHz in a downlink, and B29 corresponds to a frequency range of 717 MHz to 728 MHz in a downlink.

Example 65 includes the signal booster of Example 56, wherein: the first antenna is a server antenna that is configured to be communicatively coupled to the first antenna port; the second antenna is a donor antenna that is configured to be communicatively coupled to the second antenna port; the third antenna is a second server antenna that is configured to be communicatively coupled to the third antenna port; and the fourth antenna is a second donor antenna that is configured to be communicatively coupled to the fourth antenna port.

Example 66 includes the signal booster of Example 56, wherein: the first antenna port is further configured to receive an unamplified uplink signal from the mobile device and transmit an amplified downlink signal to the mobile device; the second antenna port is further configured to receive an unamplified downlink signal from the base station and transmit an amplified uplink signal to the base station; the third antenna port is further configured to receive an unamplified uplink signal from the mobile device and transmit an amplified downlink signal to the mobile device; and the fourth antenna port is further configured to receive an unamplified downlink signal from the base station and transmit an amplified uplink signal to the base station.

Example 67 includes a signal repeater comprising: a first signal repeater configured to amplify signals in a first band in an uplink direction, wherein the first signal repeater comprises one or more uplink signal paths, wherein an uplink signal path of the one or more uplink signal paths is configured to amplify signals in the first band for communication to a base station in the uplink direction; and a second signal repeater communicatively coupled to the first signal repeater, wherein the second signal repeater is configured to amplify signals in a second band in a downlink direction, wherein the second signal repeater comprises at least one downlink signal path configured to amplify signals in the second band for communication to a mobile device in the downlink direction, and wherein a frequency range of the second band with the downlink direction is contiguous with a frequency range of the first band with the uplink direction.

Example 68 includes the signal booster of Example 67, wherein the frequency range of the second band with the downlink direction is contiguous with the frequency range of the first band with the uplink direction when a relative gap between the first band and the second band is less than a relative gap threshold for a selected filter type.

Example 69 includes the signal booster of Example 68, wherein the relative gap threshold is 1.65%, 1.35%, 1.0%, 0.70%, or 0.50%.

Example 70 includes the signal booster of Example 68, wherein the selected filter type is a surface acoustic wave (SAW) filter.

Example 71 includes the signal repeater of Example 67, wherein the signal repeater is operable to boost signals in multiple frequency-contiguous bands using the first signal repeater that is physically isolated from the second signal repeater within the signal repeater.

Example 72 includes the signal repeater of Example 67, wherein: the first signal repeater comprises one or more downlink signal paths; and the second signal repeater comprises one or more uplink signal paths.

Example 73 includes the signal repeater of Example 67, wherein the first band is band 12 (B12) and the second band is band 29 (B29), wherein B12 corresponds to a frequency range of 699 megahertz (MHz) to 716 MHz in an uplink and a frequency range of 729 MHz to 746 MHz in a downlink, and B29 corresponds to a frequency range of 717 MHz to 728 MHz in a downlink.

Example 74 includes the signal repeater of Example 67, wherein the first signal repeater further comprises a controller operable to: determine a received signal strength indication (RSSI) of a received signal communicated from the second signal repeater; and adjust a gain of an uplink signal path in the first signal repeater based on the RSSI of the received signal in order to perform network protection.

Example 75 includes the signal booster of Example 67, wherein: the first signal repeater further comprises: a first antenna port configured to receive an unamplified uplink signal from the mobile device and transmit an amplified downlink signal to the mobile device via a first server antenna; and a second antenna port configured to receive an unamplified downlink signal from the base station and transmit an amplified uplink signal in the first band to the base station via a first donor antenna; and the second signal repeater further comprises: a third antenna port configured to receive an unamplified uplink signal from the mobile device and transmit an amplified downlink signal in the second band to the mobile device via a second server antenna; and a fourth antenna port configured to receive an unamplified downlink signal from the base station and transmit an amplified uplink signal to the base station via a second donor antenna.

Example 76 includes a signal booster, comprising: a first amplification and filtering path operable to amplify and filter signals in a first band in a first direction, wherein the first amplification and filtering path includes a first intermediate frequency (IF) filter to shift a frequency of a first signal; and a second amplification and filtering path operable to amplify and filter signals in a second band in a second direction, wherein the second amplification and filtering path includes a second intermediate frequency (IF) filter to shift a frequency of a second signal, and wherein a frequency range of the second band with the second direction is contiguous with a frequency range of the first band with the first direction.

Example 77 includes the signal booster of Example 76, wherein the frequency range of the second band with the second direction is contiguous with the frequency range of the first band with the first direction when a relative gap between the first band and the second band is less than a relative gap threshold for a selected filter type.

Example 78 includes the signal booster of Example 77, wherein the relative gap threshold is 1.65%, 1.35%, 1.0%, 0.70%, or 0.50%.

Example 79 includes the signal booster of Example 77, wherein the selected filter type is a surface acoustic wave (SAW) filter.

Example 80 includes the signal booster of Example 77, wherein the first direction is an uplink direction and the second direction is a downlink direction.

Example 81 includes the signal booster of Example 76, wherein: the first signal with a shifted frequency is passed through a first band pass filter (BPF) on the first amplification and filtering path; and the second signal with a shifted frequency is passed through a second band pass filter (BPF) on the second amplification and filtering path.

Example 82 includes the signal booster of Example 76, wherein the first amplification and filtering path and the second amplification and filtering path include one or more switchable band pass filters (BPFs).

Example 83 includes the signal booster of Example 82, wherein: a signal in the first band is directed to a first switchable BPF in the first amplification and filtering path, and the first switchable BPF is associated with the first band; and a signal in the second band is directed to a second switchable BPF in the first amplification and filtering path, and the second switchable BPF is associated with the second band.

Example 84 includes the signal booster of Example 82, wherein the one or more BPFs are switched on or off depending on a geographical location of the signal booster.

Example 85 includes the signal booster of Example 76, wherein the first band is band 12 (B12) and the second band is band 29 (B29), wherein B12 corresponds to a frequency range of 699 megahertz (MHz) to 716 MHz in an uplink and a frequency range of 729 MHz to 746 MHz in a downlink, and B29 corresponds to a frequency range of 717 MHz to 728 MHz in a downlink.

Example 86 includes the signal booster of Example 76, further comprising: an inside antenna configured to transmit signals to a mobile device; and an outside antenna configured to transmit signals to a base station, wherein the first amplification and filtering path is coupled between the inside antenna and the outside antenna, and the second amplification and filtering path is coupled between the inside antenna and the outside antenna.

Example 87 includes the signal booster of Example 76, wherein: the first amplification and filtering path is communicatively coupled to a first antenna port configured to receive an unamplified uplink signal from a mobile device via a first server antenna for communication to a second antenna port that is configured to transmit an amplified uplink signal in the first band to the base station via a first donor antenna; and the second amplification and filtering path is communicatively coupled to a fourth antenna port that is configured to receive an unamplified downlink signal in the second band from the base station via a second donor antenna for communication to a third antenna port that is configured to transmit an amplified downlink signal in the second band to the mobile device via a second server antenna.

Example 88 includes a signal booster, comprising: a first antenna; a second antenna; one or more first diplexers communicatively coupled to the first antenna; one or more second diplexers communicatively coupled to the second antenna; one or more first multiplexers communicatively coupled to the one or more first diplexers; one or more second multiplexers communicatively coupled to the one or more second diplexers; a selected number of downlink amplification and filtering paths for at least seven bands, the downlink amplification and filtering paths being positioned in between the first antenna and the second antenna; and a selected number of uplink amplification and filtering paths for at least seven bands, the uplink amplification and filtering paths being positioned in between the first antenna and the second antenna, and wherein a frequency range of a first band with a first direction of the at least seven bands is contiguous with a frequency range of a second band with a second direction of the at least seven bands.

Example 89 includes the signal booster of Example 88, wherein the frequency range of the second band with the second direction is contiguous with the frequency range of the first band with the first direction when a relative gap between the first band and the second band is less than a relative gap threshold for a selected filter type.

Example 90 includes the signal booster of Example 89, wherein the relative gap threshold is 1.65%, 1.35%, 1.0%, 0.70%, or 0.50%.

Example 91 includes the signal booster of Example 89, wherein the selected filter type is a surface acoustic wave (SAW) filter.

Example 92 includes the signal booster of Example 89, wherein the first direction is an uplink direction and the second direction is a downlink direction.

Example 93 includes the signal booster of Example 88, further comprising: a first antenna port configured to receive an unamplified uplink signal in a first band from a mobile device via a first antenna for communication to a second antenna port that is configured to transmit an amplified uplink signal in the first band for transmission to a base station via the second antenna; and the second antenna port configured to receive an unamplified downlink signal in a second band from the base station for communication to the first antenna port that is configured to transmit an amplified downlink signal to the mobile device via the first antenna.

Example 94 includes a signal booster, comprising: a first antenna; a second antenna; a first double-input single-output (DISO) filter communicatively coupled to the first antenna; a second DISO filter communicatively coupled to the second antenna; and one or more amplification and filtering paths for a selected number of bands, the one or more amplification and filtering paths being communicatively coupled to the first DISO filter and the second DISO filter.

Example 95 includes the signal booster of Example 94, wherein each amplification and filtering path includes at least one single-input single-output (SISO) filter.

Example 96 includes the signal booster of Example 94, further comprising a return loss measurement circuit operable to measure a return loss in a coaxial cable of the signal booster.

Example 97 includes the signal booster of Example 96, further comprising a controller configured to: determine when the return loss is above a defined threshold; and generate a notification indicating that the return loss is above the defined threshold.

Example 98 includes the signal booster of Example 96, wherein the return loss measurement circuit includes a directional coupler, a radio frequency (RF) detector and a reference signal source.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A signal booster, comprising:
a first signal booster configured to amplify signals in a first band in a first direction, wherein the first signal booster includes a first antenna port and a second antenna port, wherein:
the first antenna port is configured to communicate signals with a first antenna for communication with a mobile device; and
the second antenna port is configured to communicate signals with a second antenna for communication with a base station; and
a second signal booster communicatively coupled to the first signal booster, wherein the second signal booster is configured to amplify signals in a second band in a second direction, and wherein the second signal booster includes a third antenna port and a fourth antenna port, wherein:
the third antenna port is configured to communicate signals with a third antenna for communication with the mobile device; and
the fourth antenna port is configured to communicate signals with a fourth antenna for communication with the base station; and
wherein a frequency range of the second band with the second-direction is contiguous with a frequency range of the first band with the first direction,
wherein the frequency range of the second band with the second-direction is contiguous with the frequency range of the first band with the first-direction when a relative gap between the first band and the second band is less than a relative gap threshold for a selected filter type, wherein the relative gap is a bandwidth of a gap or guard band between the first band and the second band divided by a center frequency of the gap or the guard band.

2. The signal booster of claim 1, wherein the relative gap threshold is 1.65%, 1.35%, 1.0%, 0.70%, or 0.50%.

3. The signal booster of claim 1, wherein:
the selected filter type is a surface acoustic wave (SAW) filter; or
the first direction is an uplink direction and the second direction is a downlink direction.

4. The signal booster of claim 1, wherein the signal booster is operable to boost signals in multiple frequency-contiguous bands using the first signal booster that is physically isolated from the second signal booster within the signal booster.

5. The signal booster of claim 1, wherein the first signal booster comprises:
an uplink signal path configured to amplify and filter signals in the first band; and
a downlink signal path configured to amplify and filter signals in the first band; and
the second signal booster comprises a downlink signal path configured to amplify and filter signals in the second band.

6. The signal booster of claim 1, wherein the first band is band 12 (B12) and the second band is band 29 (B29), wherein B12 corresponds to a frequency range of 699 megahertz (MHz) to 716 MHz in an uplink and a frequency range of 729 MHz to 746 MHz in a downlink, and B29 corresponds to a frequency range of 717 MHz to 728 MHz in a downlink.

7. The signal booster of claim 1, wherein:
the first antenna is a server antenna that is configured to be communicatively coupled to the first antenna port;
the second antenna is a donor antenna that is configured to be communicatively coupled to the second antenna port;
the third antenna is a server antenna that is configured to be communicatively coupled to the third antenna port; or
the fourth antenna is a donor antenna that is configured to be communicatively coupled to the fourth antenna port.

8. The signal booster of claim 1, wherein the first signal booster further comprises a controller operable to perform network protection.

9. The signal booster of claim 8, wherein the controller is configured to:
determine a received signal strength indication (RSSI) of a received signal communicated from the second signal booster; and
adjust a gain of an uplink signal path in the first signal booster based on the RSSI of the received signal in order to perform the network protection.

10. The signal booster of claim 9, wherein the uplink signal path is associated with band 2 (B2) or band 4 (B4), and the RSSI of the received signal is associated with band 29 (B29).

11. The signal booster of claim 1, wherein first antenna and the second antenna are positioned at a selected distance from the third antenna and the fourth antenna to increase physical isolation between the first and second antennas and the third and fourth antennas, wherein the physical isolation serves to mitigate an overlap between one or more band pass filters in the first signal booster and the second signal booster.

12. The signal booster of claim 1, wherein the first signal booster and the second signal booster are included in a single form factor, and the first signal booster includes a first set of antenna ports and the second signal booster includes a second set of antenna ports.

13. The signal booster of claim 1, wherein:
the first antenna port is further configured to receive an unamplified uplink signal from the mobile device and transmit an amplified downlink signal to the mobile device;
the second antenna port is further configured to receive an unamplified downlink signal from the base station and transmit an amplified uplink signal to the base station;
the third antenna port is further configured to receive an unamplified uplink signal from the mobile device and transmit an amplified downlink signal to the mobile device; and
the fourth antenna port is further configured to receive an unamplified downlink signal from the base station and transmit an amplified uplink signal to the base station.

14. A cellular signal booster, comprising:
a first signal booster, comprising:
a first cellular signal amplifier configured to amplify signals in a first band in a first-direction;
a first antenna port communicatively coupled to the first cellular signal amplifier;

a second antenna port communicatively coupled to the first cellular signal amplifier; and an uplink signal path of the first cellular signal amplifier that is configured to amplify and filter signals in the first band; and a second signal booster communicatively coupled to the first signal booster, the second signal booster comprising:

a second cellular signal amplifier configured to amplify signals in a second band in a second-direction, and a frequency range of the second band with the second direction is contiguous with a frequency range of the first band with the first direction;

a third antenna port communicatively coupled to the second cellular signal amplifier;

a fourth antenna port communicatively coupled to the second cellular signal amplifier; and a downlink signal path of the second cellular signal amplifier that is configured to amplify and filter signals in the second band, wherein the frequency range of the second band with the second-direction is contiguous with the frequency range of the first band with the first-direction when a relative gap between the first band and the second band is less than a relative gap threshold for a selected filter type.

15. The signal booster of claim 14, wherein:
the relative gap threshold is 1.65%, 1.35%, 1.0%, 0.70%, or 0.50%;
the selected filter type is a surface acoustic wave (SAW) filter; or
the first direction is an uplink direction and the second direction is a downlink direction.

16. The cellular signal booster of claim 14, wherein the cellular signal booster is operable to boost signals in multiple frequency-contiguous bands using first signal booster antennas that are physically isolated from second signal booster antennas within the cellular signal booster.

17. The cellular signal booster of claim 14, wherein the first signal booster comprises a downlink signal path configured to amplify and filter signals in the first band;
and the second signal booster includes an uplink signal path configured to amplify and filter signals in the second band.

18. The cellular signal booster of claim 14, wherein the first band is band 12 (B12) and the second band is band 29 (B29), wherein B12 corresponds to a frequency range of 699 megahertz (MHz) to 716 MHz in an uplink and a frequency range of 729 MHz to 746 MHz in a downlink, and B29 corresponds to a frequency range of 717 MHz to 728 MHz in a downlink.

19. The signal booster of claim 14, wherein:
the first antenna is a server antenna that is configured to be communicatively coupled to the first antenna port;
the second antenna is a donor antenna that is configured to be communicatively coupled to the second antenna port;
the third antenna is a second server antenna that is configured to be communicatively coupled to the third antenna port; and
the fourth antenna is a second donor antenna that is configured to be communicatively coupled to the fourth antenna port.

20. The signal booster of claim 14, wherein:
the first antenna port is further configured to receive an unamplified uplink signal from the mobile device and transmit an amplified downlink signal to the mobile device;
the second antenna port is further configured to receive an unamplified downlink signal from the base station and transmit an amplified uplink signal to the base station;
the third antenna port is further configured to receive an unamplified uplink signal from the mobile device and transmit an amplified downlink signal to the mobile device; and
the fourth antenna port is further configured to receive an unamplified downlink signal from the base station and transmit an amplified uplink signal to the base station.

21. A signal repeater comprising:
a first signal repeater configured to amplify signals in a first band in an uplink direction, wherein the first signal repeater comprises one or more uplink signal paths, wherein an uplink signal path of the one or more uplink signal paths is configured to amplify signals in the first band for communication to a base station in the uplink direction; and a second signal repeater communicatively coupled to the first signal repeater, wherein the second signal repeater is configured to amplify signals in a second band in a downlink direction, wherein the second signal repeater comprises at least one downlink signal path configured to amplify signals in the second band for communication to a mobile device in the downlink direction, and wherein a frequency range of the second band with the downlink direction is contiguous with a frequency range of the first band with the uplink direction wherein the frequency range of the second band with the second-direction is contiguous with the frequency range of the first band with the first-direction when a relative gap between the first band and the second band is less than a relative gap threshold for a selected filter type.

22. The signal booster of claim 4, wherein:
the relative gap threshold is 1.65%, 1.35%, 1.0%, 0.70%, or 0.50%; or
the selected filter type is a surface acoustic wave (SAW) filter.

23. The signal repeater of claim 21, wherein the signal repeater is operable to boost signals in multiple frequency-contiguous bands using the first signal repeater that is physically isolated from the second signal repeater within the signal repeater.

24. The signal repeater of claim 21, wherein:
the first signal repeater comprises one or more downlink signal paths; and
the second signal repeater comprises one or more uplink signal paths.

25. The signal repeater of claim 21, wherein the first band is band 12 (B12) and the second band is band 29 (B29), wherein B12 corresponds to a frequency range of 699 megahertz (MHz) to 716 MHz in an uplink and a frequency range of 729 MHz to 746 MHz in a downlink, and B29 corresponds to a frequency range of 717 MHz to 728 MHz in a downlink.

26. The signal repeater of claim 21, wherein the first signal repeater further comprises a controller operable to:
determine a received signal strength indication (RSSI) of a received signal communicated from the second signal repeater; and adjust a gain of an uplink signal path in the first signal repeater based on the RSSI of the received signal in order to perform network protection.

27. The signal booster of claim 21, wherein:
the first signal repeater further comprises:
  a first antenna port configured to receive an unamplified uplink signal from the mobile device and transmit an amplified downlink signal to the mobile device via a first server antenna; and
  a second antenna port configured to receive an unamplified downlink signal from the base station and transmit an amplified uplink signal in the first band to the base station via a first donor antenna; and
the second signal repeater further comprises:
  a third antenna port configured to receive an unamplified uplink signal from the mobile device and transmit an amplified downlink signal in the second band to the mobile device via a second server antenna; and
  a fourth antenna port configured to receive an unamplified downlink signal from the base station and transmit an amplified uplink signal to the base station via a second donor antenna.

* * * * *